(12) United States Patent
Cho et al.

(10) Patent No.: US 11,687,122 B2
(45) Date of Patent: Jun. 27, 2023

(54) DISPLAY DEVICE

(71) Applicant: LG ELECTRONICS INC., Seoul (KR)

(72) Inventors: Dongwoo Cho, Seoul (KR); Jungyul Sakong, Seoul (KR); Hyungkwon Yun, Seoul (KR); Munhwan Kim, Seoul (KR); Changwan Noh, Seoul (KR); Junghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 165 days.

(21) Appl. No.: 17/420,318

(22) PCT Filed: Jul. 8, 2019

(86) PCT No.: PCT/KR2019/008355
§ 371 (c)(1),
(2) Date: Jul. 1, 2021

(87) PCT Pub. No.: WO2020/262749
PCT Pub. Date: Dec. 30, 2020

(65) Prior Publication Data
US 2022/0066516 A1    Mar. 3, 2022

(30) Foreign Application Priority Data

Jun. 24, 2019    (KR) .................. 10-2019-0074971

(51) Int. Cl.
*G06F 1/16* (2006.01)
*F16M 11/04* (2006.01)
(Continued)

(52) U.S. Cl.
CPC ........... *G06F 1/1656* (2013.01); *F16M 11/04* (2013.01); *G06F 1/1607* (2013.01);
(Continued)

(58) Field of Classification Search
CPC ........ A47B 21/06; A47B 21/00; F16M 11/04; F16M 2200/08; G06F 1/1637; G06F 1/1607; G06F 1/1683; G06F 1/1688
See application file for complete search history.

(56) References Cited

U.S. PATENT DOCUMENTS 6,134,103 A * 10/2000 Ghanma ............... G06F 1/1681
  248/920
8,797,728 B2 * 8/2014 Han ...................... F16M 11/06
  361/679.21
(Continued)

FOREIGN PATENT DOCUMENTS

KR   10-2006-0008721 A    1/2006
KR   10-2006-0061588 A    6/2006
(Continued)

*Primary Examiner* — Nidhi Thaker
(74) *Attorney, Agent, or Firm* — Birch, Stewart, Kolasch & Birch, LLP

(57) ABSTRACT

A display device including a display panel; a frame coupled to a rear of the display panel; at least one first guide plate fixed to a rear of the frame and having a guide groove; and a stand positioned below the display panel. Further, the stand include a top plate including at least one protruding support guide inserted into the guide groove of the at least one first guide plate to couple the display panel to the stand; a bottom plate spaced apart from the top plate; first and second side plates connecting the top plate and the bottom plate; and a bottom receiving part coupled to a lower part of the bottom plate and including an electronic component accommodation space.

17 Claims, 23 Drawing Sheets

(51) Int. Cl.
*A47B 21/00* (2006.01)
*A47B 21/06* (2006.01)

(52) U.S. Cl.
CPC .......... *G06F 1/1637* (2013.01); *G06F 1/1683* (2013.01); *G06F 1/1688* (2013.01); *A47B 21/00* (2013.01); *A47B 21/06* (2013.01); *F16M 2200/08* (2013.01)

(56) References Cited

U.S. PATENT DOCUMENTS

| | | | |
|---|---|---|---|
| 10,340,673 B2* | 7/2019 | Li ........................ | H02G 3/0437 |
| 2002/0130981 A1* | 9/2002 | Ma ........................ | F16M 11/10 |
| | | | 348/843 |
| 2003/0103092 A1* | 6/2003 | Byoun .................. | F16M 13/02 |
| | | | 345/905 |
| 2005/0050784 A1* | 3/2005 | Bang ...................... | F16M 11/22 |
| | | | 40/607.01 |
| 2006/0108483 A1* | 5/2006 | Wolff .................... | G06F 1/1632 |
| | | | 248/122.1 |
| 2006/0208145 A1* | 9/2006 | Chen ..................... | F16M 11/16 |
| | | | 248/289.11 |
| 2007/0045505 A1* | 3/2007 | Chen ..................... | F16M 11/22 |
| | | | 361/679.21 |
| 2011/0001734 A1 | 1/2011 | Kim | |
| 2013/0094127 A1* | 4/2013 | Lu ......................... | F16M 11/06 |
| | | | 361/679.01 |
| 2016/0135311 A1* | 5/2016 | Liu ........................ | F16M 11/26 |
| | | | 248/176.1 |
| 2016/0239045 A1* | 8/2016 | Tseng .................... | G06F 1/1601 |
| 2016/0306602 A1 | 10/2016 | Kim et al. | |

FOREIGN PATENT DOCUMENTS

| | | |
|---|---|---|
| KR | 10-2006-0125101 A | 12/2006 |
| KR | 10-2011-0003654 A | 1/2011 |
| KR | 10-2016-0123616 A | 10/2016 |

* cited by examiner

[FIG. 1]
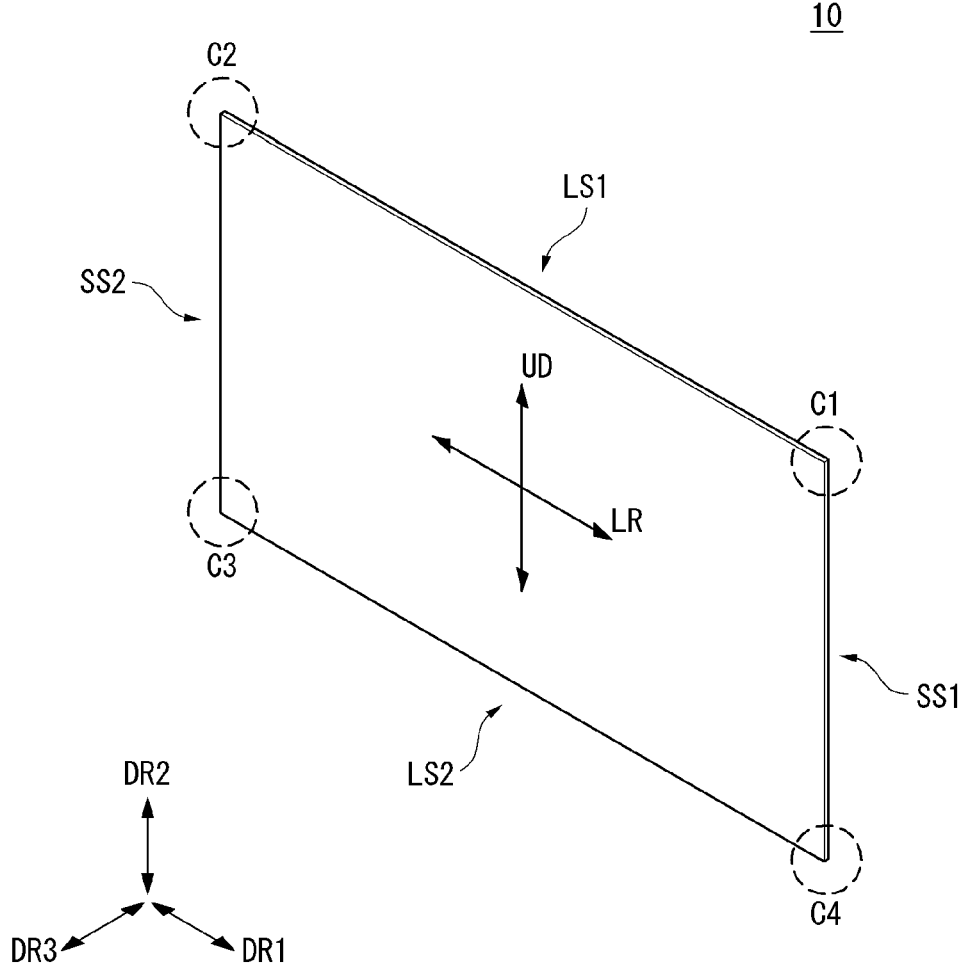

[FIG. 2]
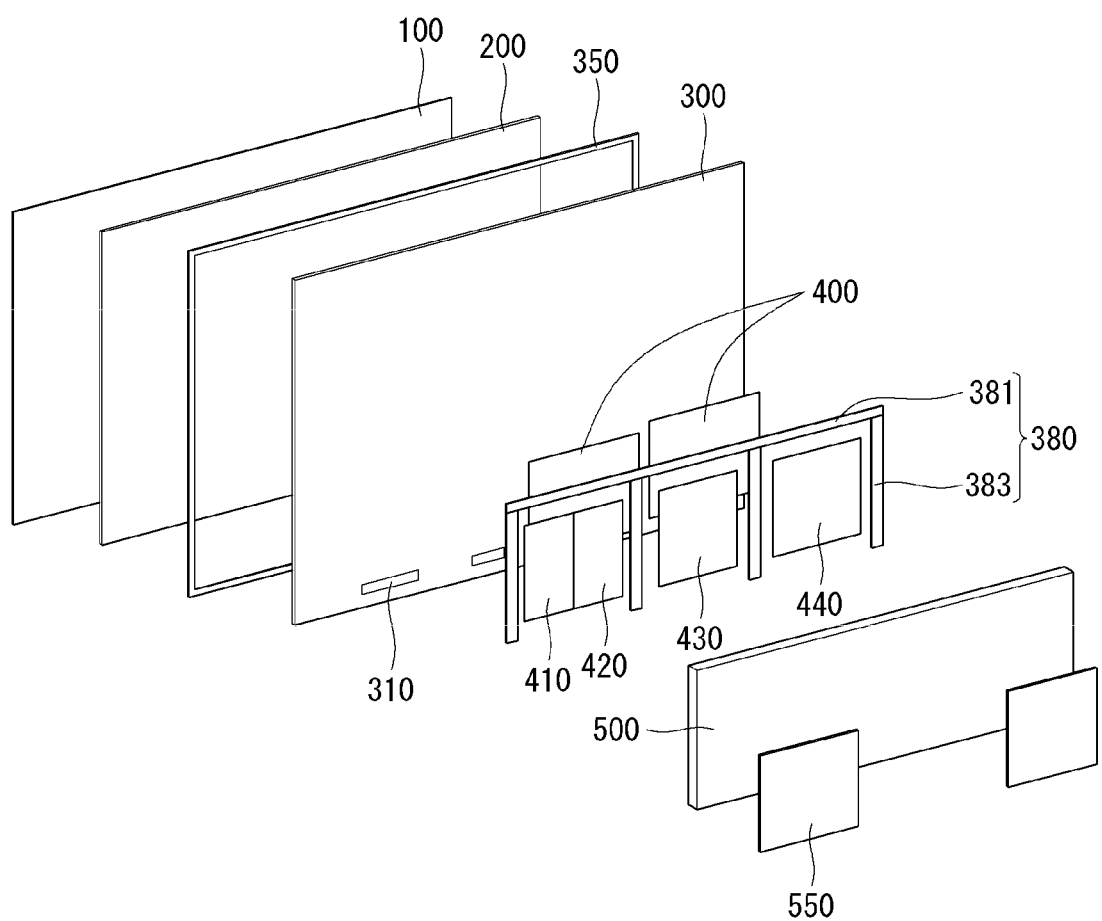

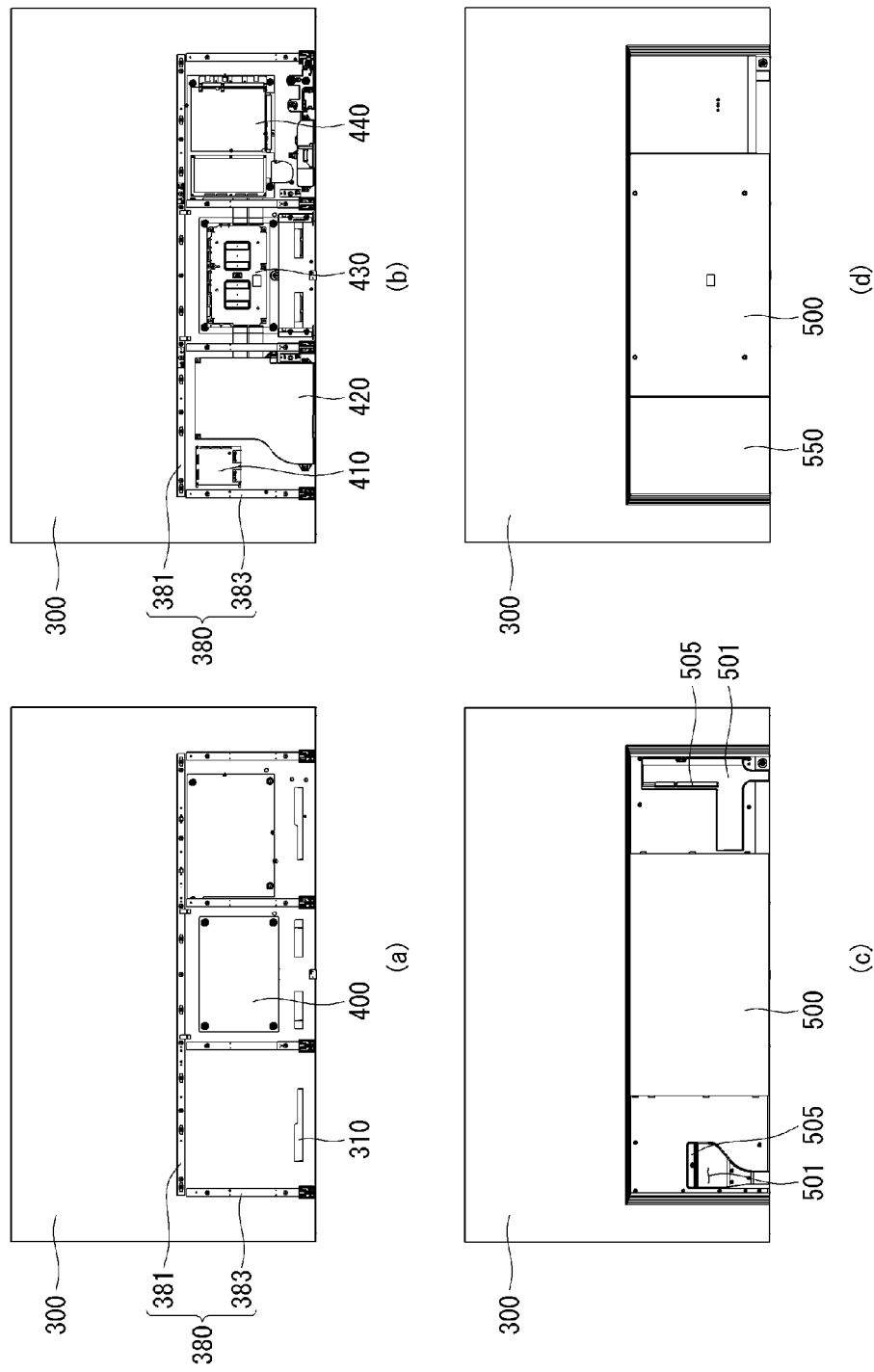
[FIG. 3]

[FIG. 4]
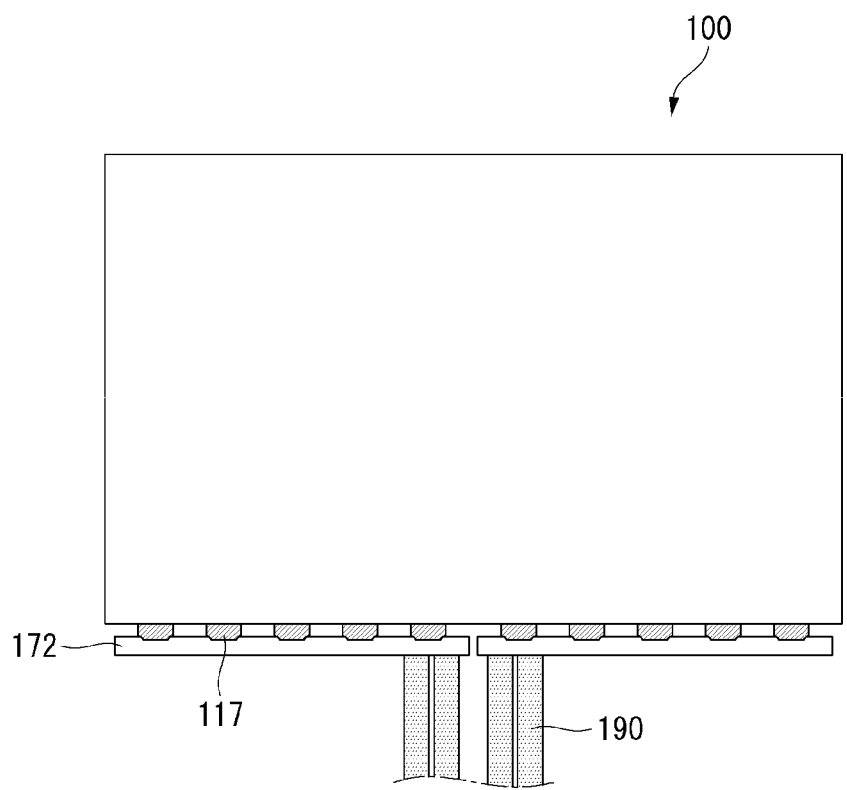

[FIG. 5]
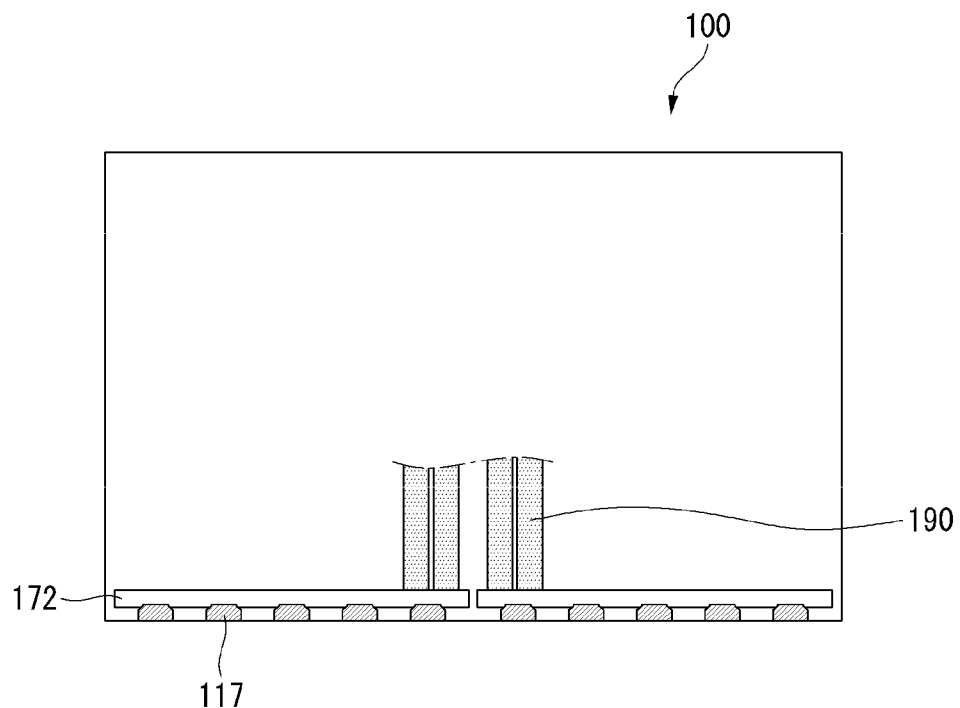

[FIG. 6]
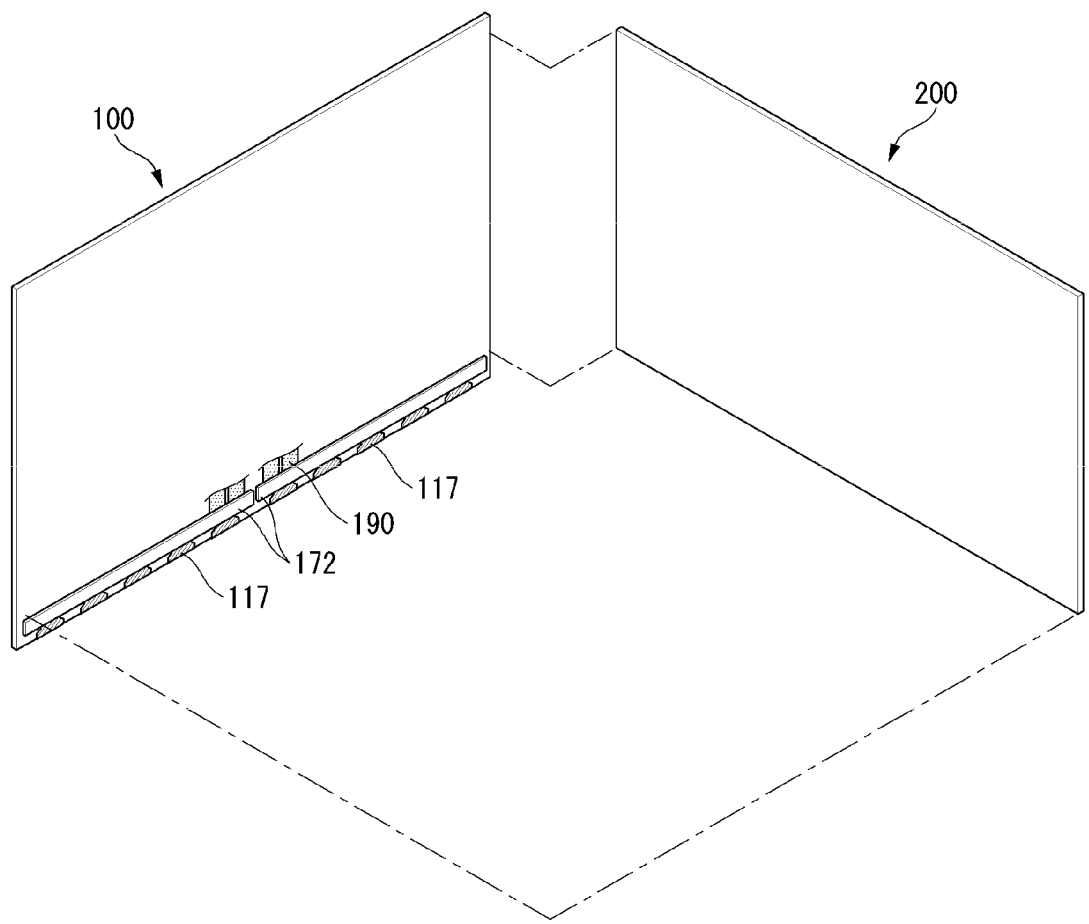

[FIG. 7]
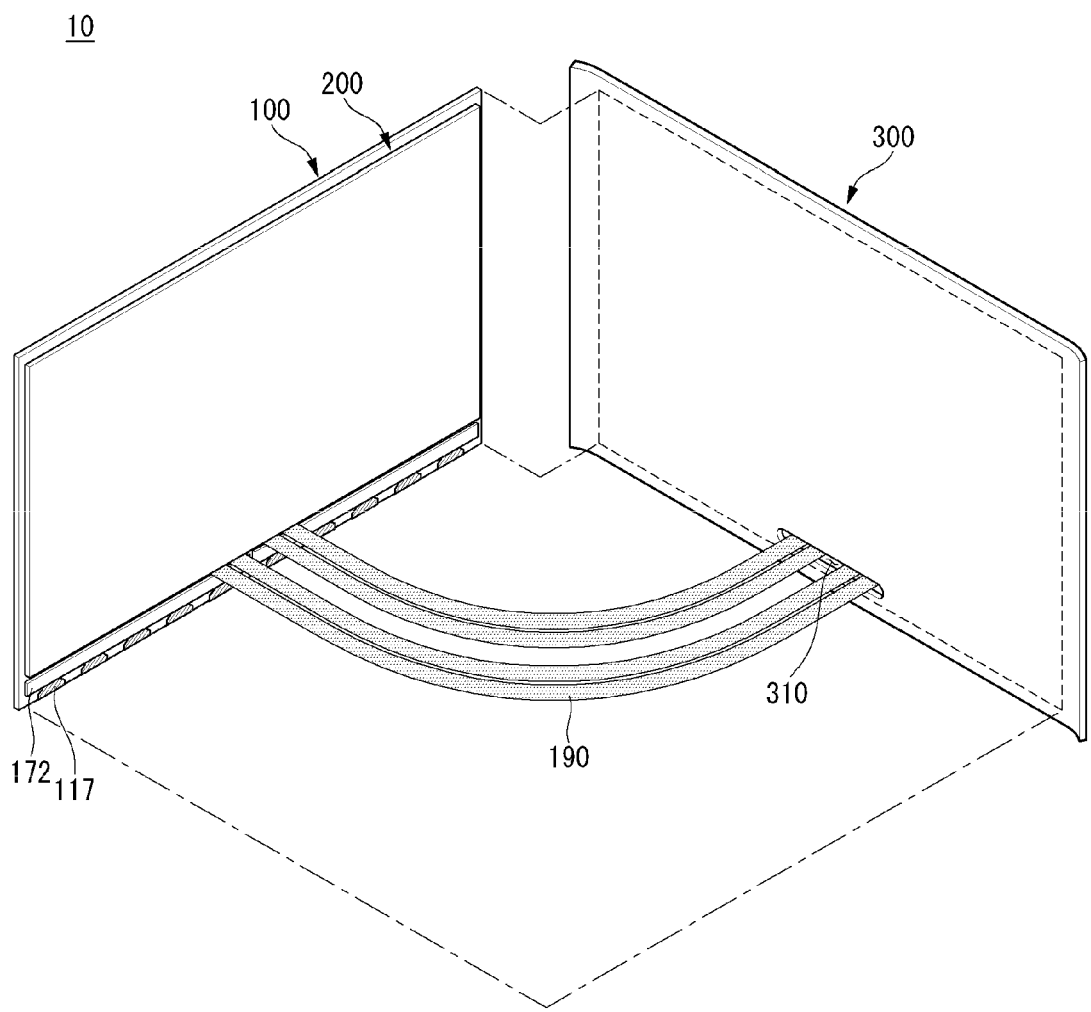

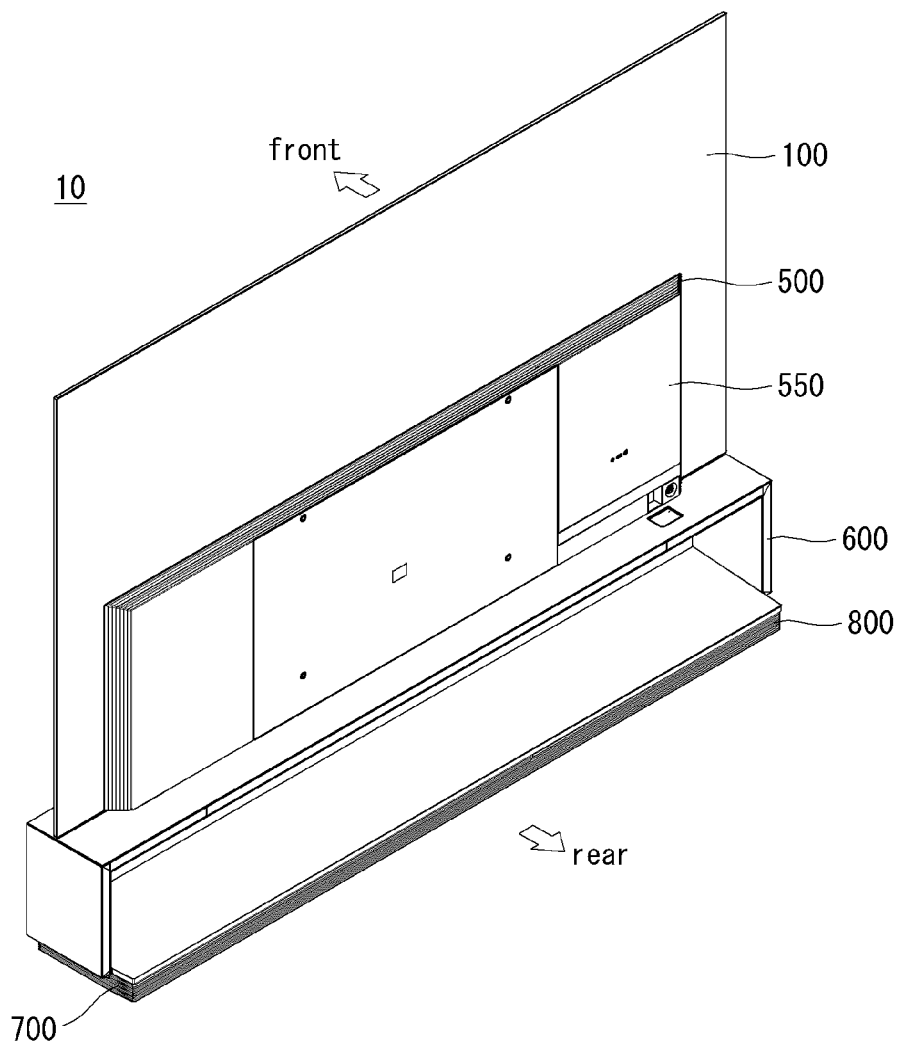

[FIG. 9]
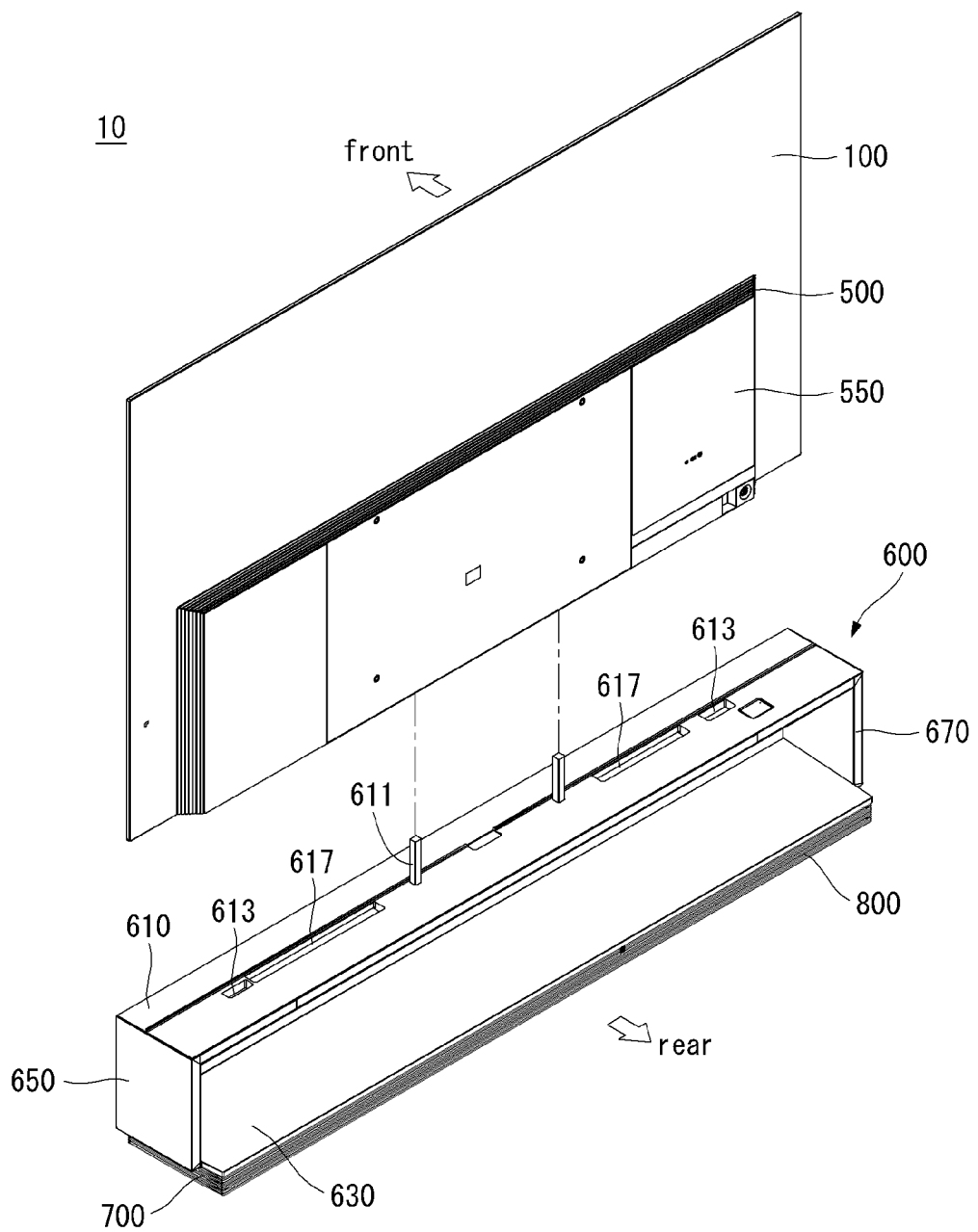

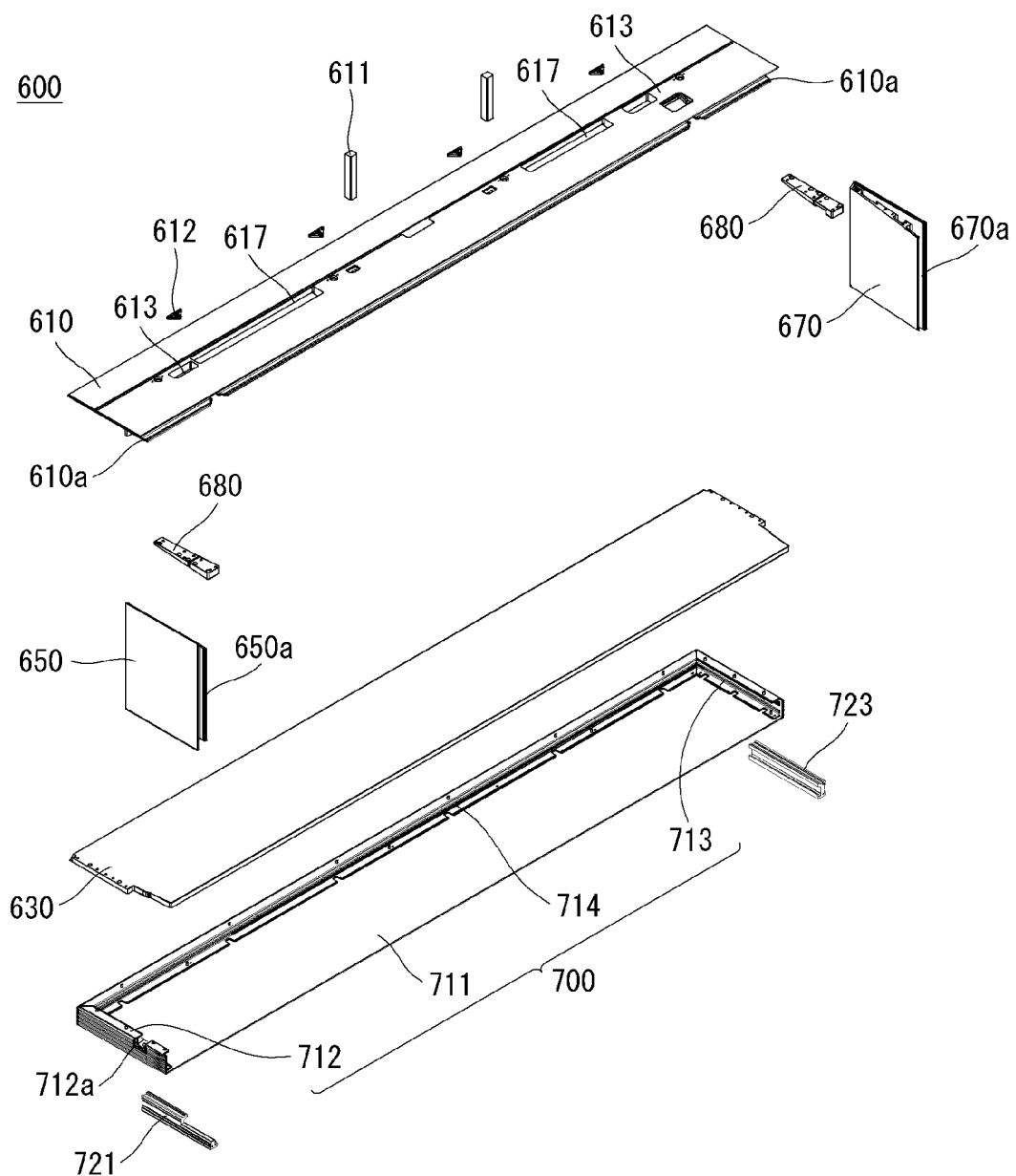
[FIG. 10]

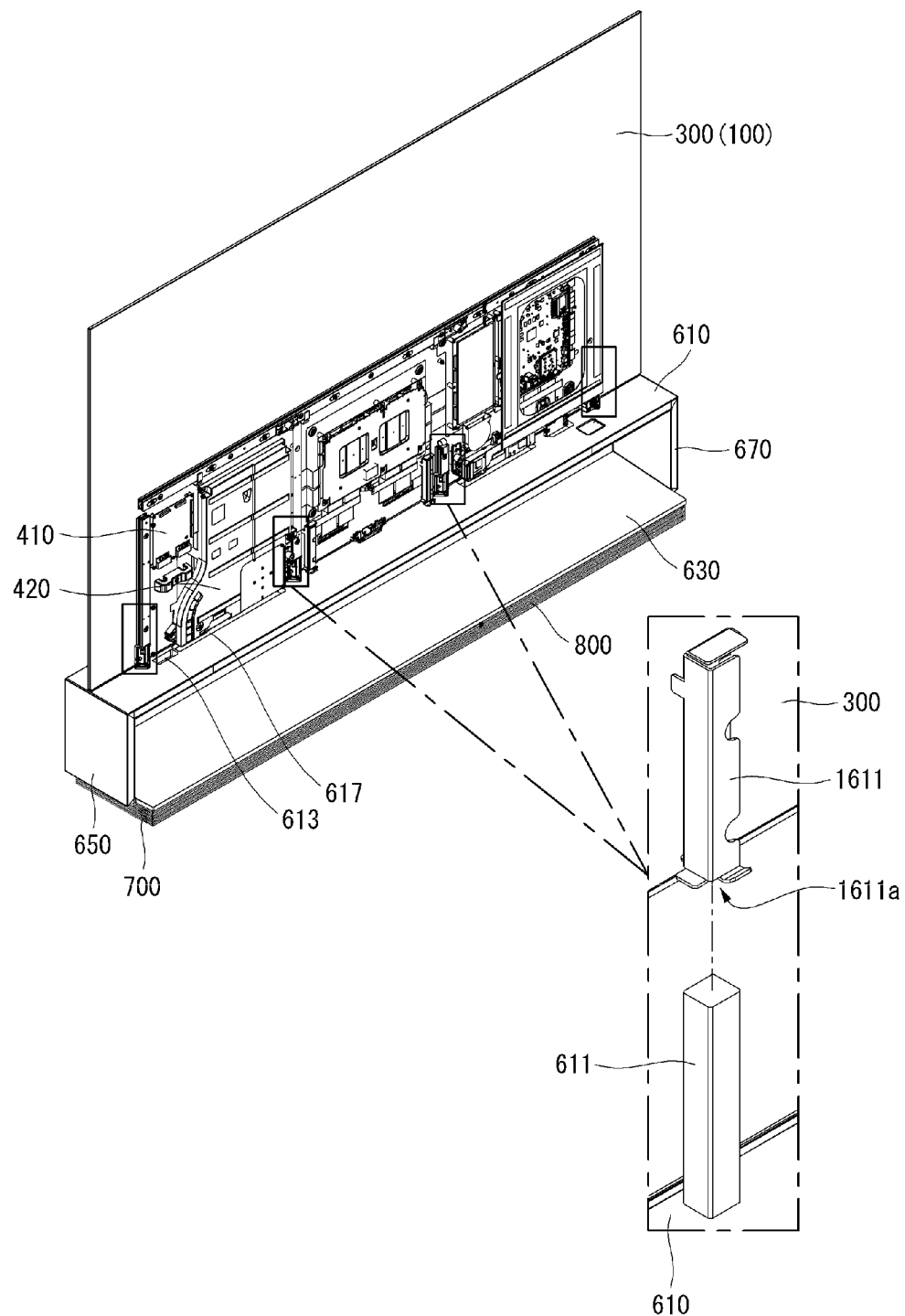
[FIG. 11]

[FIG. 12]
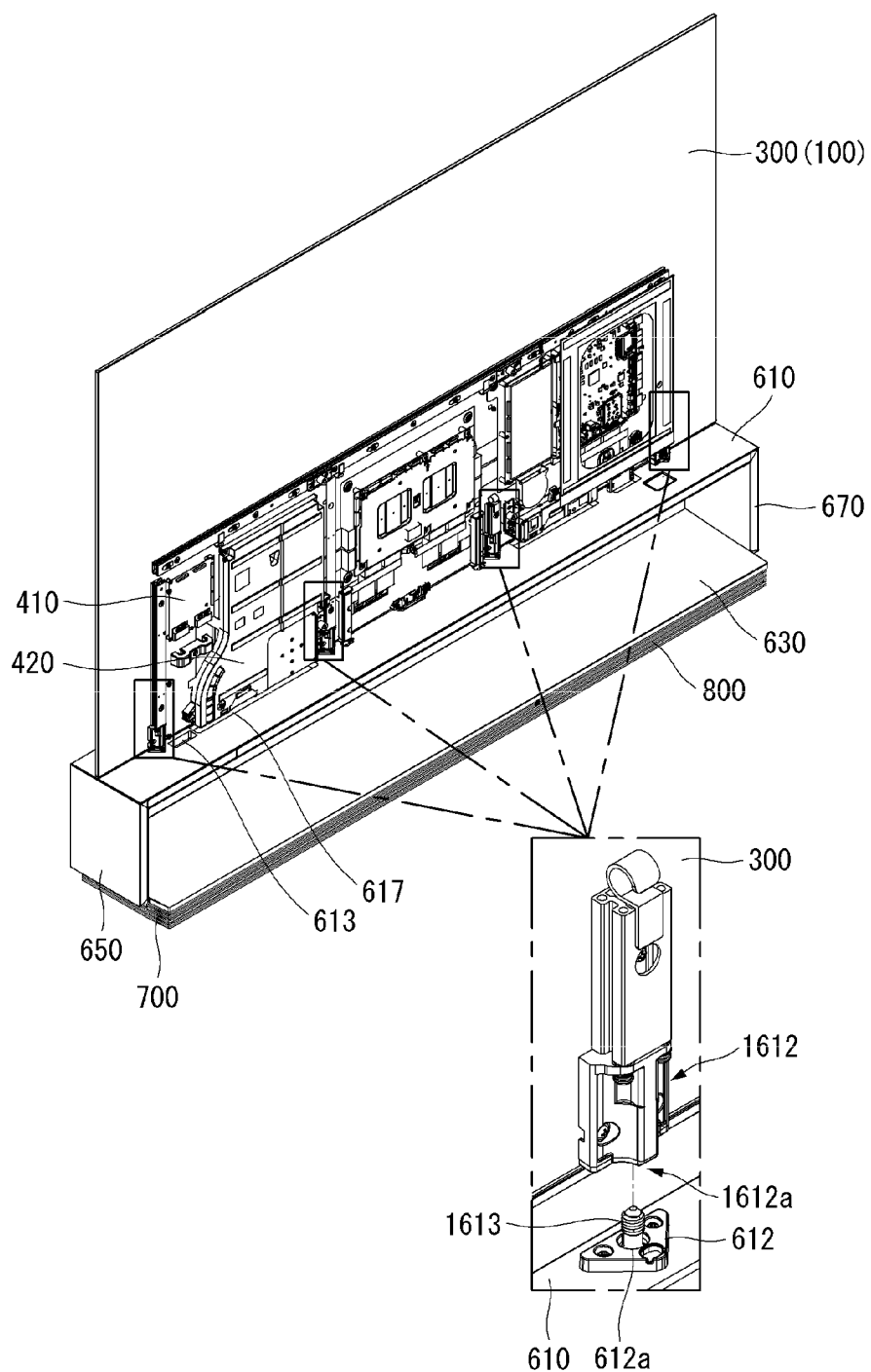

[FIG. 13]
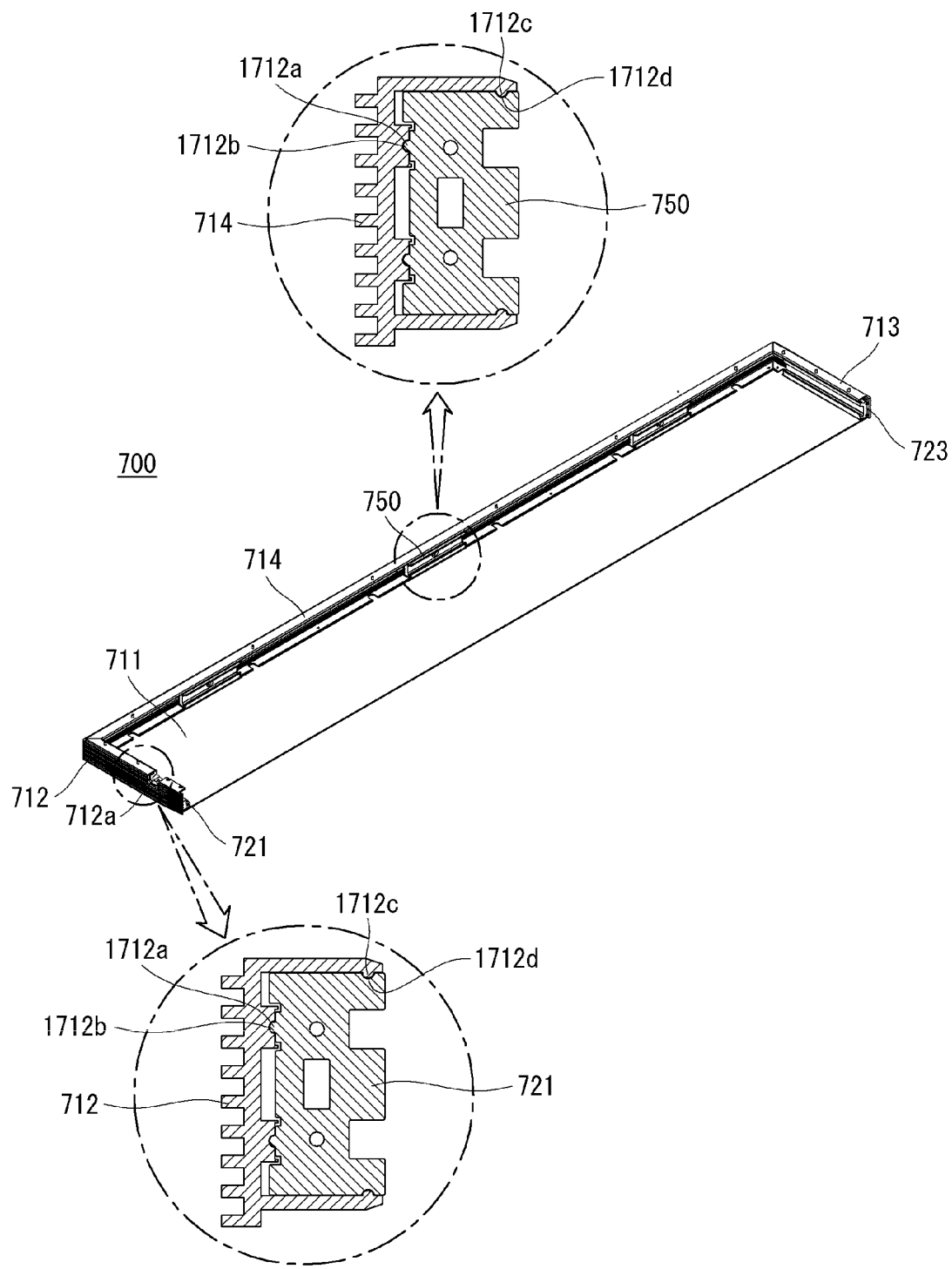

[FIG. 14]
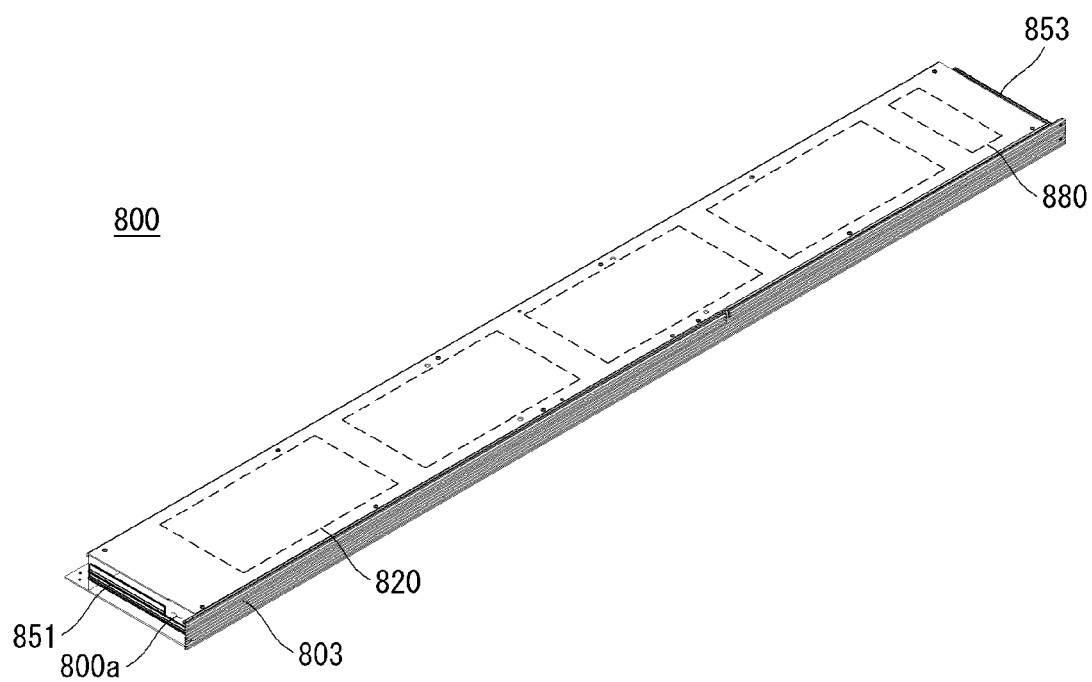

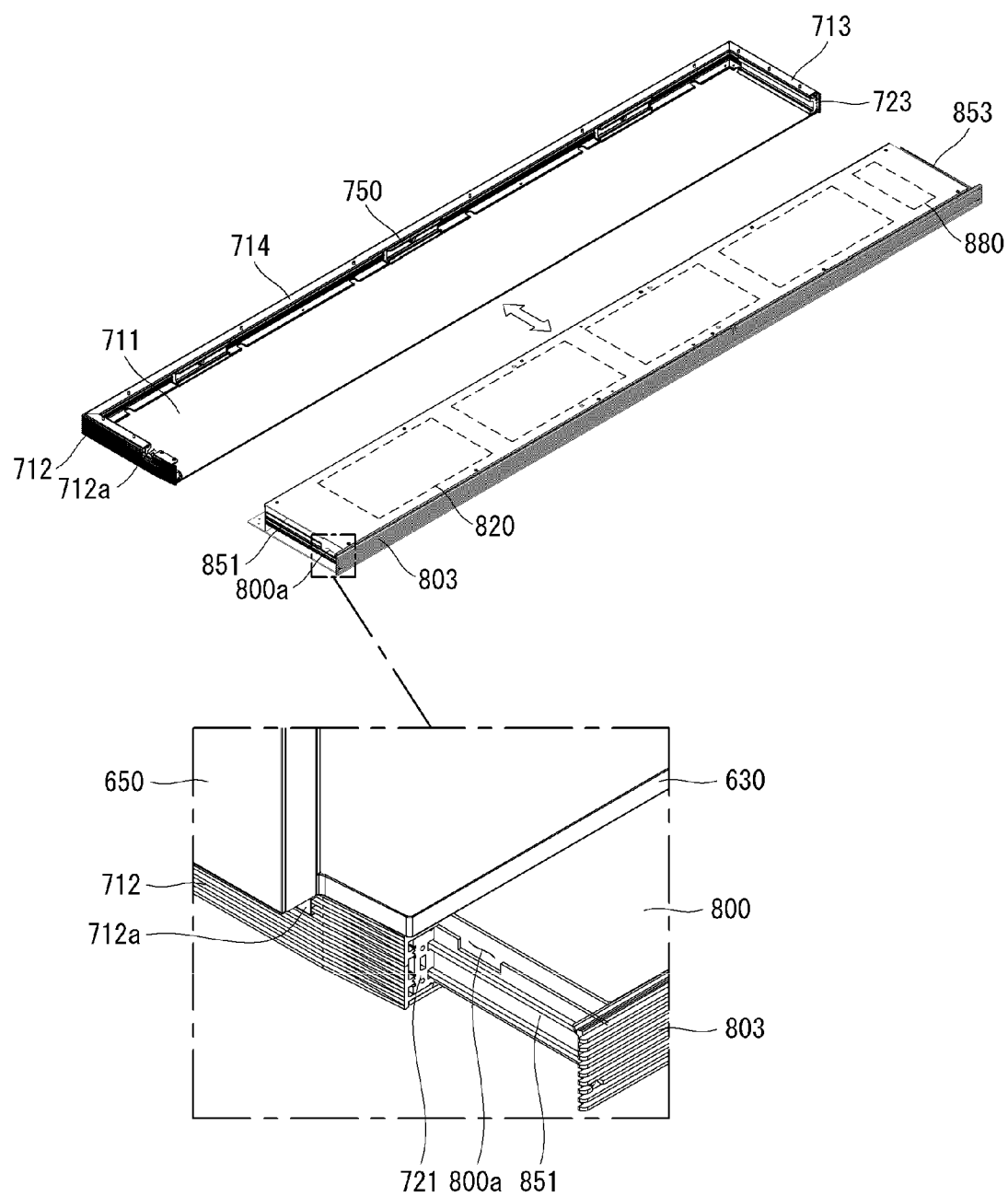
[FIG. 15]

[FIG. 16]
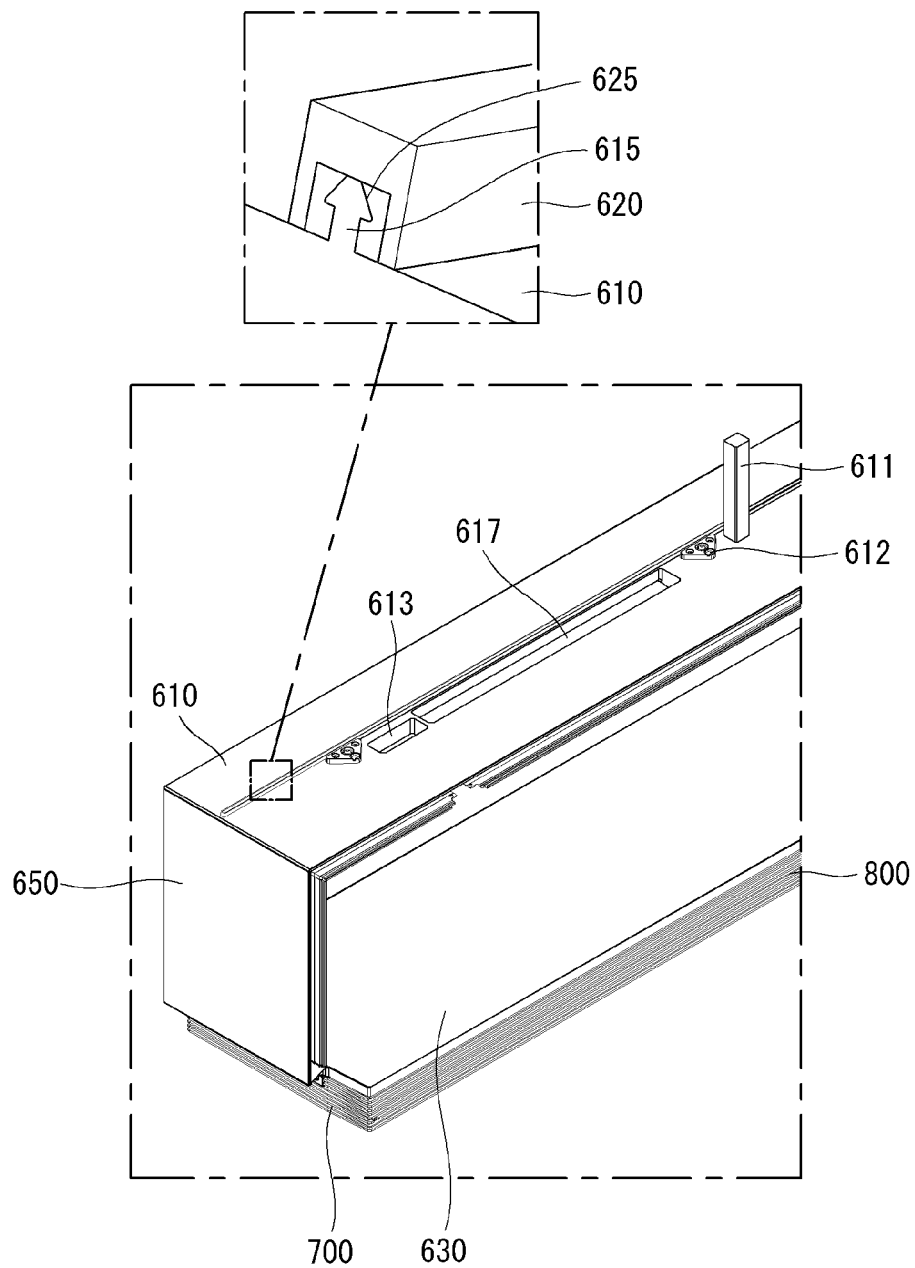

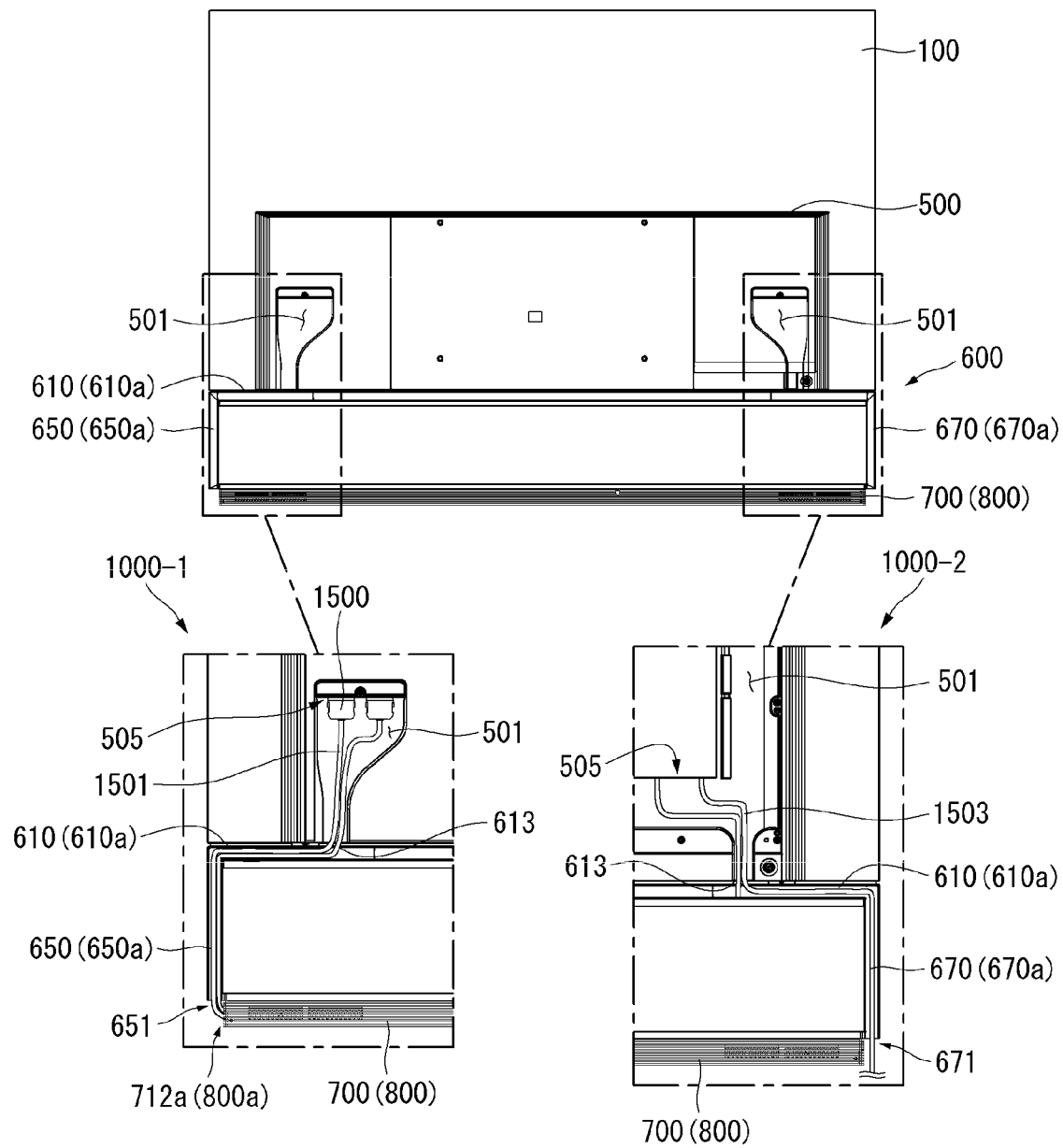
[FIG. 17]

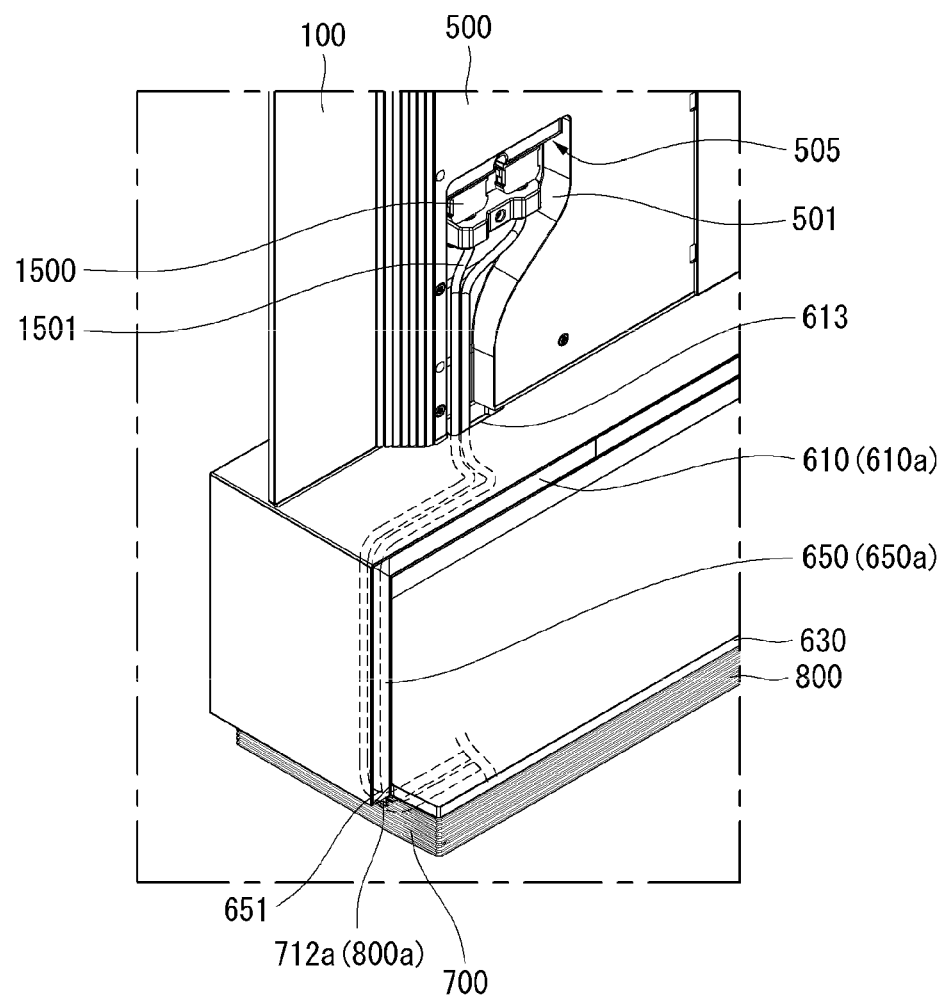
[FIG. 18]

[FIG. 19]
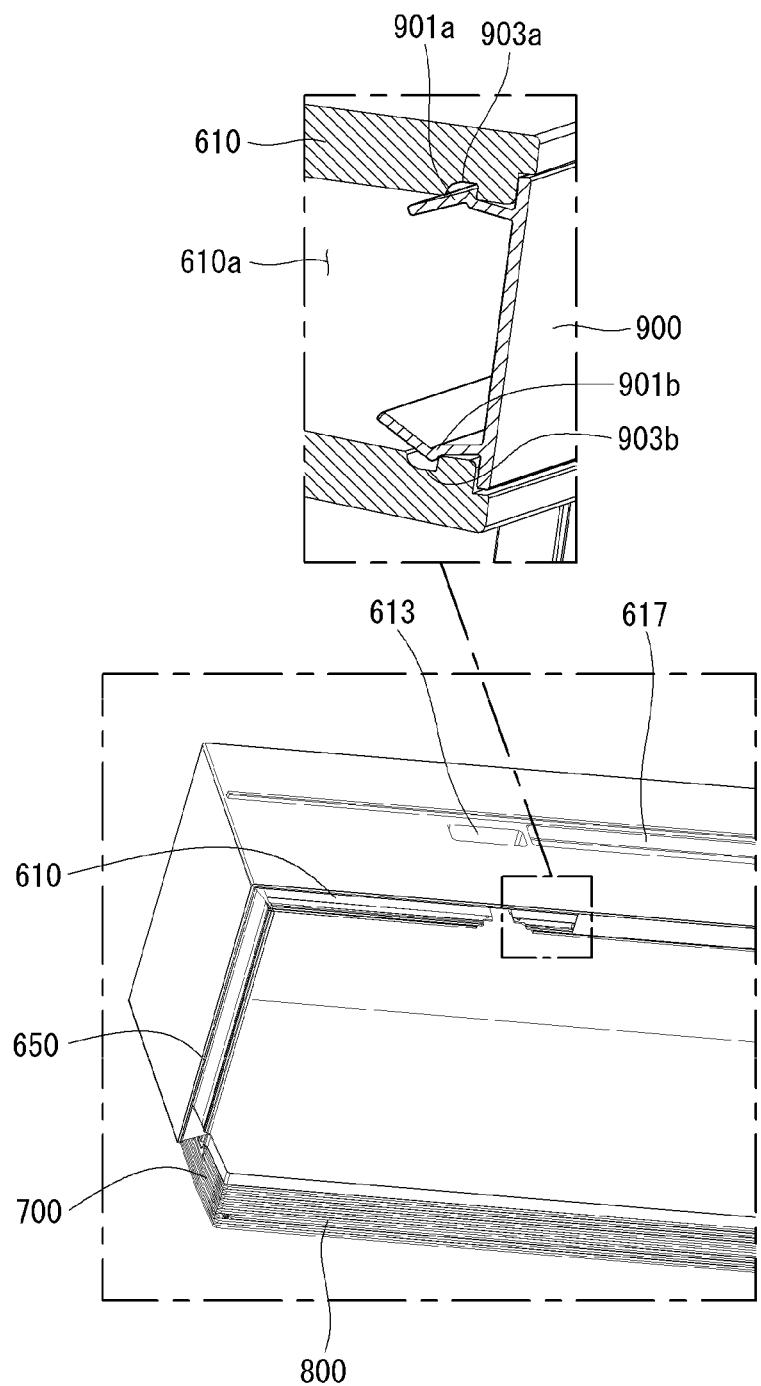

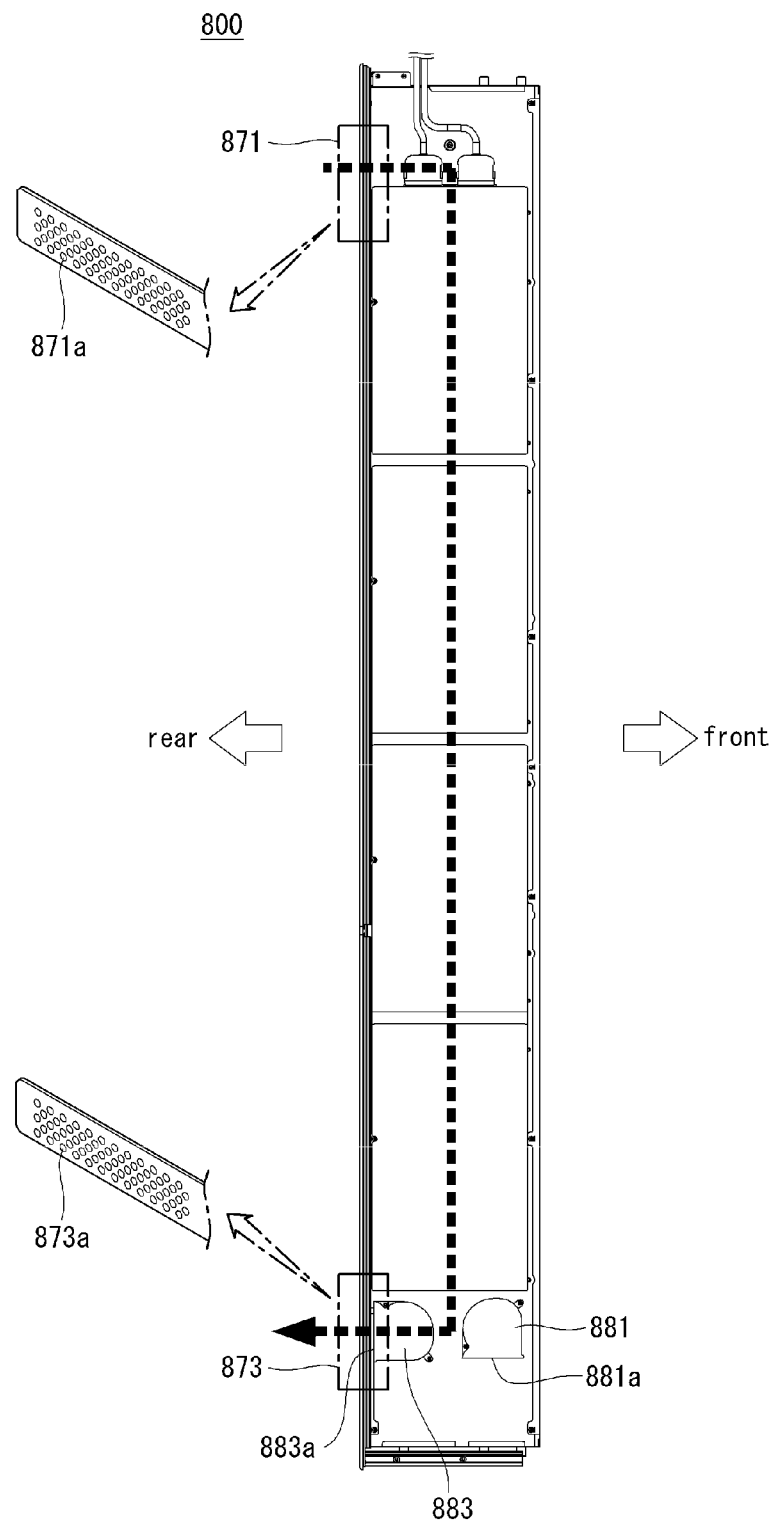
[FIG. 20]

[FIG. 21]
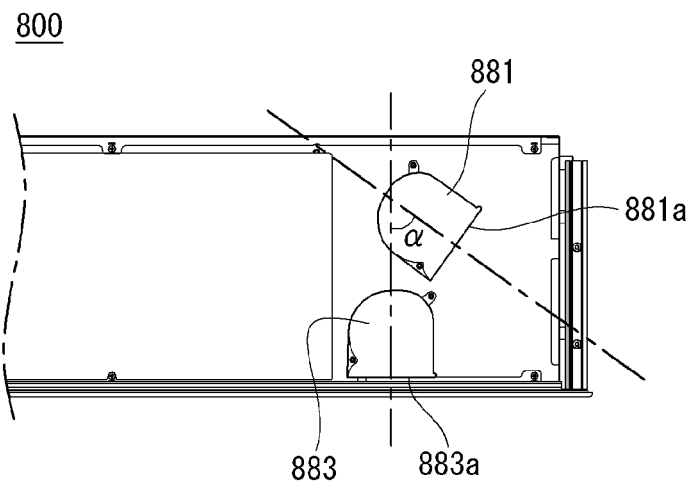
[FIG. 22]
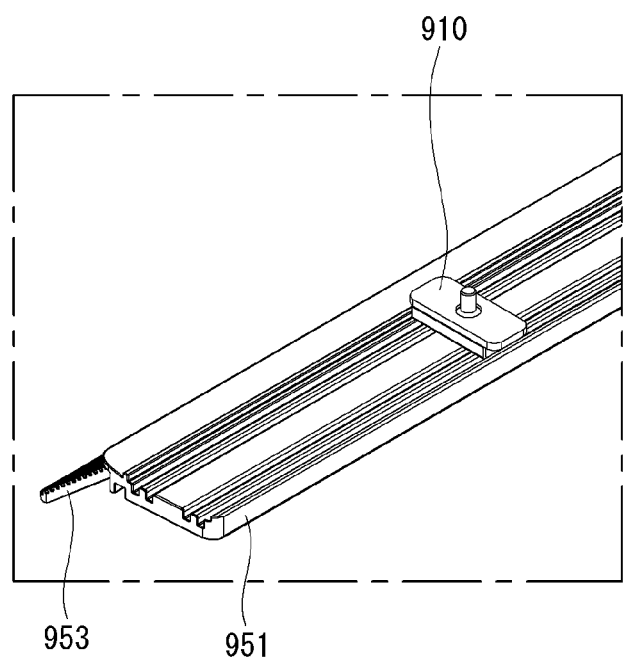

[FIG. 23]
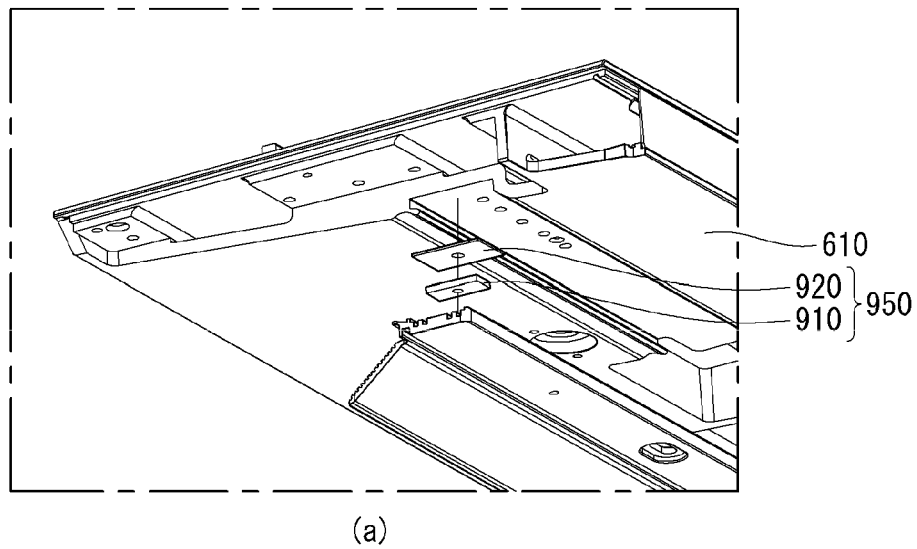
(a)
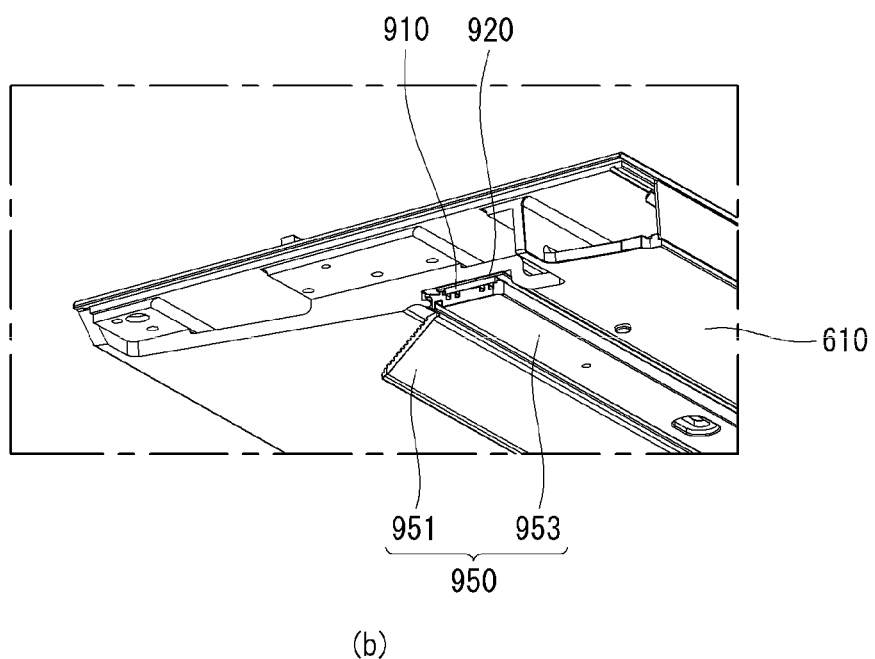
(b)

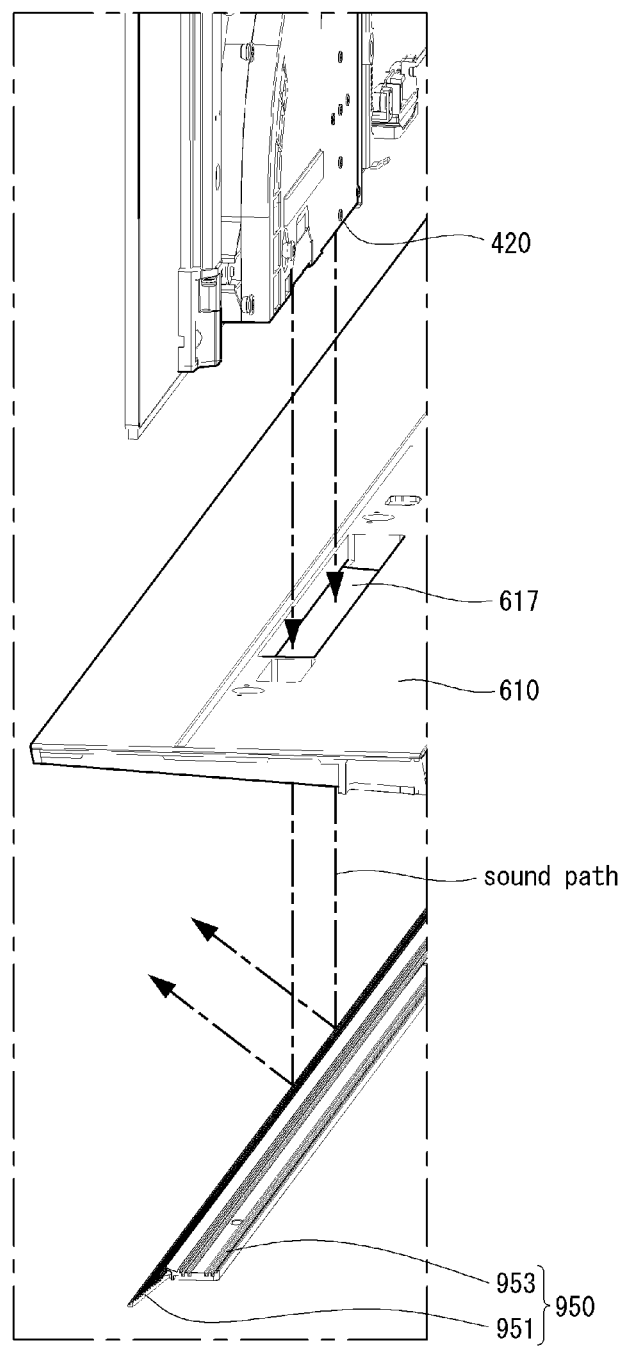
[FIG. 24]

DISPLAY DEVICE

CROSS-REFERENCE TO RELATED APPLICATIONS

This application is the National Phase of PCT International Application No. PCT/KR2019/008355, filed on Jul. 8, 2019, which claims the priority benefit under 35 U.S.C. 119(a) to Korean Patent Application No. 10-2019-0074971, filed on Jun. 24, 2019, the contents of which are all hereby incorporated by reference herein in their entirety.

BACKGROUND OF THE INVENTION

Field of the Invention

The present disclosure relates to a display device.

Background Art

As the information society develops, the demand for display devices is also increasing in various forms, and in response to this, various display devices such as a liquid crystal display device (LCD), a plasma display panel (PDP), an electroluminescent display (ELD), and a vacuum fluorescent display (VFD) have been researched and used.

Among them, a display device using an organic light emitting diode (OLED) has advantages in that it has excellent luminance characteristics and viewing angle characteristics compared to a liquid crystal display device, and can be implemented in an ultra-thin form without requiring a backlight unit.

SUMMARY OF THE INVENTION

The present disclosure aims to solve the above-mentioned problems and other problems. Another object may be to provide a stand capable of easily supporting a display panel coupled to a case member.

Another object may be to provide a display device capable of easily receiving a cable for applying power or a signal to a display panel in a stand.

Another object may be to provide a display device having a heat dissipation mechanism capable of easily dissipating heat generated by a component.

Another object may be to provide a display device capable of providing high-quality sound by having a sound reflector capable of switching a path of sound provided from a speaker.

According to an aspect of the present disclosure in order to achieve the above or other objects, the present disclosure provides a display panel; a frame coupled to the display panel at a rear of the display panel; a stand positioned below the display panel, and including a top plate provided with at least one supporter guide protruding toward the frame; and a first guide plate fixed to a rear of the frame, and having a guide groove into which the supporter guide is inserted, wherein the stand includes: a bottom plate positioned below the top plate to face the top plate and spaced apart from the top plate; a first side plate connecting the top plate and the bottom plate at one side of the top plate and the bottom plate; a second side plate connecting the top plate and the bottom plate at the other side of the top plate and the bottom plate, and facing the first side plate; and a bottom receiving part coupled to a lower part of the bottom plate and providing an accommodation space.

In addition according to another aspect of the present disclosure, the present disclosure may further include a second guide plate fixed to a rear of the frame; and a supporter head fixed on the top plate and fixed to the second guide plate through a screw.

In addition according to another aspect of the present disclosure, the supporter guide and the supporter head may be disposed adjacent to each other along a length direction of the display panel.

In addition according to another aspect of the present disclosure, the present disclosure may further include an electronic component positioned at a rear of the frame and transmitting a predetermined power or signal to the display panel; a back cover positioned at a rear of the frame and accommodating the electronic component; and a rigid bar positioned between the frame and the back cover, wherein the rigid bar may include: a first body extending in a length direction of the display panel; and a plurality of second bodies extending from the first body in a direction perpendicular to an extension direction of the first body.

In addition according to another aspect of the present disclosure, the second bodies may be spaced apart in the length direction of the display panel, and between the adjacent second bodies, the electronic component may be disposed.

In addition according to another aspect of the present disclosure, the present disclosure may further include a cable for transmitting the predetermined power or signal to the electronic component, wherein the back cover may include: a groove provided by being partially recessed in thickness from a rear surface and accommodating at least a part of the cable; and an open hole that opens a portion of the groove, wherein the cable may pass through the open hole, or a connector connected to the cable may pass through the open hole.

In addition according to another aspect of the present disclosure, the top plate may include: a top receiving part having a predetermined inner space opened rearward; and one or more top holes opening at least a part of the top receiving part toward the display panel, wherein at least one of the first and second side plates may have the predetermined inner space opened rearward, and may include a side receiving part communicating with the top receiving part, and the cable may extend through the top hole and may be accommodated in the top receiving part and the side receiving part.

In addition according to another aspect of the present disclosure, the present disclosure may further include: a box slidingly coupled into the accommodation space of the bottom receiving part, wherein the cable may extend from the side receiving part and may be accommodated in the box.

In addition according to another aspect of the present disclosure, the bottom receiving part may include a bottom hole through which the cable passes, and the box may include a box hole through which the cable passes.

In addition according to another aspect of the present disclosure, the present disclosure may further include: a speaker positioned at a rear of the frame; and a sound reflector positioned below the top plate, wherein the sound reflector may include: a fixing part fixed to the top plate; and an inclined part extending from the fixing part, a gap between the inclined part and the top plate gradually increasing from a rear to a front, and the top plate may expose the inclined part and may include a speaker hole opened toward the speaker.

In addition according to another aspect of the present disclosure, the speaker and the speaker hole may overlap in the up-down direction.

In addition according to another aspect of the present disclosure, the speaker hole and the inclined part may overlap in the vertical direction.

In addition according to another aspect of the present disclosure, the present disclosure may further include: a magnet fixed to an upper surface of the fixing part; and an auxiliary plate fixed to a lower surface of the top plate, and made of a ferromagnetic material attached to the magnet.

In addition according to another aspect of the present disclosure, the present disclosure may further include: a buffer member supporting the display panel from below, wherein the top plate may include a locking protrusion protruding toward the display panel, and the buffer member may be fitted to the locking protrusion.

Advantageous Effects

According to at least one embodiment of the present disclosure, by providing a stand that can easily support the display panel coupled to the case member, it is possible to prevent defects due to deformation.

According to at least one embodiment of the present disclosure, a cable for applying power or signals to the display panel can be easily accommodated in the stand.

According to at least one embodiment of the present disclosure, by having a heat dissipation mechanism capable of easily dissipating heat generated by the components, it is possible to minimize component damage caused by heat.

According to at least one embodiment of the present disclosure, by providing a sound reflector capable of switching the path of sound provided from the speaker, it is possible to provide high-quality sound.

BRIEF DESCRIPTION OF THE DRAWINGS

FIGS. 1 and 2 are diagrams illustrating a display device according to an embodiment of the present disclosure.

FIG. 3 is a diagram illustrating a process of combining a display panel and a case member according to an embodiment of the present disclosure.

FIGS. 4 to 7 are diagrams illustrating a connection relationship between a display panel and a cable and a positional relationship between a cable and a case member according to an embodiment of the present disclosure.

FIGS. 8 to 16 are diagrams illustrating a detailed configuration of a display device according to an embodiment of the present disclosure.

FIGS. 17 to 19 are diagrams illustrating a cable receiving part provided in a stand according to an embodiment of the present disclosure.

FIGS. 20 and 21 are diagrams illustrating a heat dissipation structure according to an embodiment of the present disclosure.

FIGS. 22 to 24 are diagrams illustrating a sound reflector according to an embodiment of the present disclosure.

DETAILED DESCRIPTION OF THE EMBODIMENTS

Hereinafter, embodiments of the present disclosure will be described in detail with reference to the accompanying drawings, however, the same or similar elements are denoted by the same reference numerals regardless of the reference numerals, and redundant description thereof will be omitted.

The suffixes "module" and "part" for components used in the following description are given or mixed in consideration of ease of specification, and do not have their own meaning or role. Further, in describing the embodiments disclosed in this specification, when it is determined that the detailed description of the related art is likely to blur the gist of the embodiment disclosed in this specification, a detailed description thereof will be omitted. Also, the accompanying drawings are only for the purpose of easily understanding the embodiments disclosed in the present disclosure, and the technical idea disclosed in the present disclosure is not limited by the accompanying drawings, it should be understood that the present disclosure include all modifications, equivalents and substitutes included within the spirit and technical scope of the present disclosure.

Hereinafter, an organic light emitting diode panel (hereinafter, OLED panel) will be described as an example for a display panel, but the display panel applicable to the present disclosure is not limited to the OLED panel.

FIGS. 1 and 2 are diagrams illustrating a display device according to an embodiment of the present disclosure. FIG. 3 is a diagram illustrating a process of combining a display panel and a case member according to an embodiment of the present disclosure.

Referring to FIGS. 1 and 2, a display panel 100 of a display device 10 may include a first long side LS1, a second long side LS2 opposite the first long side LS1, a first short side SS1 adjacent to the first long side LS1 and the second long side LS2, and a second short side SS2 opposite the first short side SS1.

Here, it is possible that the first short side area SS1 is referred to as a first side area, the second short side area SS2 is referred to as a second side area opposite the first side area, the first long side area LS1 is referred to as a third side area adjacent to the first side area and the second side area and positioned between the first side area and the second side area, and the second long side area LS2 is referred to as a fourth side area adjacent to the first side area and the second side area and positioned between the first side area and the second side area and opposite the third side area.

In addition, for convenience of description, although lengths of the first and second long sides LS1 and LS2 are longer than lengths of the first and second short sides SS1 and SS2, the lengths of the first and second long sides LS1 and LS2 may be approximately equal to the lengths of the first and second short sides SS1 and SS2.

In addition, hereinafter, a first direction DR1 may be a direction parallel to the long sides LS1 and LS2 of the display panel 100, and a second direction DR2 may be a direction parallel to the short sides SS1 and SS2 of the display panel 100.

The first direction DR1 may be parallel to the horizontal axis. The first direction DR1 may be referred to as a first horizontal axis. The second direction DR2 may be parallel to the vertical axis. The second direction DR2 may be referred to as the vertical axis. A third direction DR3 may be parallel to the horizontal axis. The third direction DR3 may be referred to as a second horizontal axis.

A direction in which the display panel 100 displays an image may be referred to as a forward direction or a front surface. When the display panel 100 displays the image, a direction in which the image cannot be observed may be referred to as a rearward direction or a rear surface. The third direction DR3 may be a back-and-forth direction.

When the display device 10 is viewed from the forward direction or the front surface, the first long side LS1 side may be referred to as an upper side or an upper surface.

Similarly, the second long side LS2 side may be referred to as a lower side or a lower surface. Similarly, the first short side SS1 side may be referred to as a right side or right surface, and the second short side SS2 side may be referred to as a left side or a left surface.

A lateral side of the display device 10 may mean at least one of the upper surface, the lower surface, the right surface, and the left surface of the display device 10.

In addition, the first long side LS1, the second long side LS2, the first short side SS1, and the second short side SS2 may be referred to as edges of the display device. In addition, a point at which the first long side LS1, the second long side LS2, the first short side SS1, and the second short side SS2 meet each other may be referred to as a corner. For example, a point where the first long side LS1 meets the first short side SS1 may be a first corner C1, a point where the first long side LS1 meets the second short side SS2 may be a second corner C2, a point where the second short side SS2 meets the second long side LS2 may be a third corner C3, and a point where the second long side LS2 meets the first short side SS1 may be a fourth corner C4.

Here, a direction from the first short side SS1 to the second short side SS2 or a direction from the second short side SS2 to the first short side SS1 may be referred to as a left-right direction LR. A direction from the first long side LS1 to the second long side LS2 or a direction from the second long side LS2 to the first long side LS1 may be referred to as an up-down direction UD.

Referring to FIGS. 2 and 3, the display panel 100 is provided on the front surface of the display device 10 and an image may be displayed. The display panel 100 may divide the image into a plurality of pixels and output the image according to color, brightness, and chroma for each pixel. The display panel 100 may be divided into an active area in which the image is displayed and an inactive area in which the image is not displayed.

The display panel 100 may include an OLED panel. The display panel 100 may emit light by itself. The display panel 100 may have a very thin thickness.

An inner plate 200 may be positioned at a rear of the display panel 100. The inner plate 200 may be attached to a rear surface of the display panel 100. The inner plate 200 may be smaller than the display panel 100. The inner plate 200 may be coupled to the rear surface of the display panel 100 by a double-sided adhesive tape or a magnet. The inner plate 200 may include a ferromagnetic material or a paramagnetic material.

The inner plate 200 may provide rigidity to the display panel 100. The inner plate 200 may receive heat from the display panel 100 and emit the heat. The inner plate 200 may have high heat conductivity. The inner plate 200 may include metal. For example, the inner plate 200 may include aluminum or aluminum alloy.

A frame 300 may be positioned at a rear of the inner plate 200. The frame 300 may provide an inner space. The frame 300 may accommodate the inner plate 200 and the display panel 100. The inner plate 200 and the display panel 100 may be positioned in the inner space formed in the frame 300. If necessary, the frame 300 may cover at least a part of side surfaces of the inner plate 200 and the display panel 100.

The frame 300 may include fiber to reinforce rigidity. For example, the frame 300 may include at least one of glass fiber, carbon fiber, a metallic wire, and metallic fiber. The frame 300 may include micro fiber.

A middle cabinet 350 may be disposed to surround an edge of the display panel 100. The middle cabinet 350 may have a frame shape of which the center is penetrated so as to surround an outer edge of the display panel 100. The middle cabinet 350 may support the edge of the display panel 100 at a rear of the display panel 100. The frame 300 may be seated on a rear surface of the middle cabinet 350 and fixed to the middle cabinet 350.

The middle cabinet 350 may be formed of a synthetic resin such as plastic or a metal material, but it is preferable to be formed of aluminum or aluminum alloy or stainless steel or a galvanized steel sheet in consideration of heat dissipation in addition to a predetermined strength.

A rigid bar 380 may be positioned at a rear of the frame 300. The rigid bar 380 may be in contact with a rear surface of the frame 300. The rigid bar 380 may provide rigidity to the frame 300 and/or the display panel 100. That is, the rigid bar 380 may be branched in multiple directions, and may prevent bending deformation of the frame 300 or the like. The rigid bar 380 may be formed of a material such as carbon fiber reinforced plastics (CFRP), but is not limited thereto.

For example, the rigid bar 380 may include a first body 381 extending in the left-right direction of the display panel 100, and a second body 383 extending in the vertical direction, for example, in the up-down direction from the first body 381. The first body 381 and the second body 383 may be formed as one body. That is, the second body 383 may be a part branched from the first body 381. Alternatively, the first body 381 and the second body 383 may be configured as separate bodies. The neighboring second bodies 383 may be positioned spaced apart by a predetermined distance. As will be described later, electronic components may be respectively positioned between the neighboring second bodies 383. Both the first body 381 and the second body 383 may be configured as a plurality of pieces.

A PCB plate 400 may be positioned at the rear of the frame 300. The PCB plate 400 may be coupled to the rear surface of the frame 300. The PCB plate 400 may be coupled to the frame 300. The PCB plate 400 may be divided into a plurality of pieces, and may be respectively positioned between the neighboring second bodies 383.

A rear surface of the PCB plate 400 may accommodate electronic components. For example, on the rear surface of the PCB plate 400, a power distributor 410, a speaker 420, a timing controller board 430, a main board 440, and the like may be mounted. The rigid bar 380 may be disposed between the electronic components. Accordingly, defects in which the electronic components are damaged due to deformation of the frame 300 by an external force can be effectively reduced.

The material of the PCB plate 400 may be different from the material of the frame 300. For example, the PCB plate 400 may include metal. For example, the PCB plate 400 may be formed through a pressing process. The frame 300 and the PCB plate 400 may be fixed to each other through an adhesive member interposed therebetween, but it is not limited thereto.

A back cover 500 may be positioned at the rear of the frame 300. The back cover 500 may be positioned at a rear of the PCB plate 400. The back cover 500 may be positioned to cover the electronic component positioned on the PCB plate 400 and may protect this. The back cover 500 may be fixed to the frame 300 through at least one fixing member. The fixing member may be a screw, but is not limited thereto.

The back cover 500 may include at least one groove 501 provided on an outer surface. The groove 501 may include one or more open holes 505 provided through the thickness of the back cover 500. The groove 501 may be a portion accommodating a part of at least one cable 1501 and 1503 (see FIG. 17) and/or at least one connector 1500 (see FIG. 17). The open hole 505 may be formed to electrically connect an electronic component disposed outside the back cover 500 and an electronic component disposed inside the back cover 500. Connecting mechanism connecting the electronic component disposed outside the back cover 500 and the electronic component disposed inside the back cover 500 may pass through the open hole 505. The cables 1501 and 1503 (see FIG. 17) may transmit external power and/or signals to the electronic components positioned on the PCB plate 400. The connector 1500 may electrically connect the cable 1501 (see FIG. 17) and the electronic component positioned on the PCB plate 400.

An auxiliary cover 550 may be positioned at a rear of the back cover 500. The auxiliary cover 550 may be positioned to cover components positioned on the groove 501 and may protect this. The auxiliary cover 550 may be fixed to the back cover 500 through at least one fixing member. The auxiliary cover 550 and the back cover 500 may be fixed to each other through a fastening method using a grommet, but are not limited thereto.

FIGS. 4 to 7 are diagrams illustrating a connection relationship between a display panel and a cable and a positional relationship between a cable and a case member according to an embodiment of the present disclosure.

Referring to FIG. 4, a member layer 117 may extend from one side of the display panel 100. For example, the member layer 117 may have a shape extending from the second long side LS2 of the display panel 100. A plurality of member layers 117 may be provided. The member layer 117 may be electrically connected to the display panel 100. The member layer 117 may include at least one of a chip on film (COF), a chip on glass (COG), a flexible printed circuit board (FPCB), and a tape carrier package (TCP).

A source PCB 172 may have a shape extending from the member layer 117. The source PCB 172 may be electrically connected to the member layer 117. A plurality of source PCB 172 may be provided.

A cable 190 may have a shape extending from the source PCB 172. The cable 190 may be electrically connected to the PCB 172. A plurality of cables 190 may be provided.

The power or/and signal provided to the cable 190 may be delivered to the source PCB 172. The power or/and signal provided to the source PCB 172 may be distributed to the member layer 117. The power or/and signal distributed to the member layer 117 may be supplied to the display panel 110.

Referring to FIG. 5, the member layer 117 may be flexible. The member layer 117 may be bent toward the rear surface of the display panel 100. The source PCB 172 connected to the member layer 117 may be positioned at the rear of the display panel 100. The cable 190 connected to the source PCB 172 may be positioned at the rear of the display panel 100.

Referring to FIGS. 6 and 7, the cable 190 may extend toward the rear of the frame 300. The cable 190 may pass through a lower portion of the inner plate 200, and extend through a slot 310 formed in the frame 300. One end of the cable 190 may pass through the slot 310 and be electrically connected to the electronic component positioned at the rear of the frame 300.

The inner plate 200 may have a smaller area than the display panel 100. In this case, since the cable 190 may extend through a free space below the inner plate 200, separate processing of the inner plate 200 may not be required.

FIGS. 8 to 16 are diagrams illustrating a detailed configuration of a display device according to an embodiment of the present disclosure.

Referring to FIGS. 8 to 16, the display device 10 may include the display panel 100 and a stand 600 positioned below the display panel 100. The stand 600 may support the display panel 100 coupled to a case member such as the inner plate 200, the frame 300, the middle cabinet 350, the back cover 500, and the auxiliary cover 550, from below.

The stand 600 may include a top plate 610, a bottom plate 630, a first side plate 650, and a second side plate 670. The stand 600 may have a case shape penetrating in forward-rearward direction by a coupling structure of the bottom plate 630, the first side plate 650, and the second side plate 670.

The top plate 610 may determine a shape of a top surface of the stand 600. Support mechanism for supporting the display panel 100 may be disposed on the top plate 610. The support mechanism may include a supporter guide 611 and a supporter head 612. The supporter guide 611 may be fixed to a first guide plate 1611 positioned at the rear of the frame 300. The supporter head 612 may be fixed to a second guide plate 1612 positioned at the rear of the frame 300.

The bottom plate 630 may determine a shape of a lower surface of the stand 600. The bottom plate 630 may be positioned below the top plate 610 to face the top plate 610, and may be positioned to be spaced apart from the top plate 610 by a predetermined distance.

The first side plate 650 may determine a shape of a right surface of the stand 600. The first side plate 650 may connect the top plate 610 and the bottom plate 630 on the right side of the top plate 610 and the bottom plate 630. That is, the first side plate 650 may connect the right side of the top plate 610 and the right side of the bottom plate 630.

The second side plate 670 may determine a shape of a left surface of the stand 600. The second side plate 670 may connect the top plate 610 and the bottom plate 630 on the left side of the top plate 610 and the bottom plate 630. That is, the second side plate 670 may connect the left side of the top plate 610 and the left side of the bottom plate 630. The second side plate 670 may face the first side plate 650.

The first side plate 650 and the second side plate 670 may be fixed to the top plate 610 through at least one screw. For example, an angle bracket 680 may be interposed between the side plates 650 and 670 and the top plate 610, and the side plates 650 and 670 and the angle bracket 680, and the top plate 610 and the angle bracket 680 may be respectively fixed through screws. It is preferable that the screw is fastened to a lower surface of the top plate 610 so that the screw is not exposed from an upper surface of the top plate 610. The first side plate 650 and the second side plate 670 may be fixed to the bottom plate 630 through at least one screw.

The top plate 610 may include the supporter guide 611. The supporter guide 611 may have a shape protruding upward from the top plate 610. A plurality of supporter guides 611 may be provided. The supporter guides 611 may be disposed along a length direction, for example a left-right direction, of the display panel 100. As the plurality of supporter guides 611 are provided, since it is possible to support the display panel 100 to which the case member is coupled at a plurality of positions, it is possible to effectively restrain and limit shaking and twisting of the display panel 100.

The first guide plate 1611 may be positioned at the rear of the frame 300. The number of first guide plates 1611 may correspond to the number of supporter guides 611. The first guide plate 1611 may be fixed to the frame 300 through a fixing member such as a screw. Alternatively, the first guide plate 1611 may be fixed to the rigid bar through a fixing member such as a screw. It may be desirable that the first guide plate 1611 be formed on the rigid bar to prevent deformation of the frame 300.

The first guide plate 1611 may include a guide groove 1611*a* into which the supporter guide 611 is inserted. The guide groove 1611*a* may be opened in a direction in which the supporter guide 611 extends. That is, the guide groove 1611*a* may penetrate upward. Movement in the left-right direction of the supporter guide 611 inserted in the guide groove 1611*a* may be limited. Movement in the up-down direction of the supporter guide 611 inserted in the guide groove 1611*a* may not be limited.

The display device 10 may further include the supporter head 612. The supporter head 612 may be positioned on the upper surface of the top plate 610. A plurality of supporter heads 612 may be provided. The supporter heads 612 may be disposed adjacent to each other along the length direction, for example, the left-right direction, of the display panel 100. In addition, the supporter heads 612 may be disposed adjacent to the supporter guide 611 along the left-right direction. The supporter head 612 may include a first hollow portion 612*a*. The first hollow portion 612*a* may be a part of the supporter head 612 penetrating in the up-down direction. Threads of a female screw may be formed on the inner surface of the first hollow portion 612*a*.

The second guide plate 1612 may be positioned at the rear of the frame 300. The number of second guide plates 1612 may correspond to the number of supporter heads 612. The second guide plate 1612 may be fixed to the frame 300 through a fixing member such as a screw. Alternatively, the second guide plate 1612 may be fixed to the rigid bar through a fixing member such as a screw. It may be desirable that the second guide plate 1612 be formed on the rigid bar to prevent deformation of the frame 300.

The second guide plate 1612 may include a second hollow portion 1612*a*. The second hollow portion 1612*a* may be a part of the second guide plate 1612 penetrating in the up-down direction. Threads of a female screw may be formed on the inner surface of the second hollow portion 1612*a*.

The supporter head 612 and the second guide plate 1612 may be coupled through a screw 1613. The screw 1613 may be inserted into the first hollow portion 612*a* and the second hollow portion 1612*a*. Accordingly, the frame 300 and the stand 600 may be fixed to each other.

By distributing and providing a coupling structure of the supporter head 612 and the second guide plate 1612 in a plurality of positions, on a front surface of the top plate 610, it is possible to secure a predetermined fastening force between the frame 300 and the top plate 610. In this case, as the central portion of the top plate 610 sags by the load of the display panel 100 and the case member, it is possible to prevent a defect in which the spacing between the frame 300 and the top plate 610 is different depending on the position.

The stand 600 may include a bottom receiving part 700. The bottom receiving part 700 may be positioned below the bottom plate 630. The bottom receiving part 700 may include a bottom body 711, a first side body 712, a second side body 713, and a third side body 714. The bottom receiving part 700 may provide an accommodation space that is open rearward by a coupling structure of the bottom body 711, the first side body 712, the second side body 713, and the third side body 714.

The bottom body 711 may determine a shape of a bottom surface of the bottom receiving part 700. The bottom body 711 may be positioned below the bottom plate 630 to face the bottom plate 630, and positioned to be spaced apart from the bottom plate 630 by a predetermined distance.

The first side body 712 may determine a shape of a right surface of the bottom receiving part 700. The first side body 712 may connect the bottom body 711 and the bottom plate 630 on the right side of the bottom body 711 and the bottom plate 630. That is, the first side body 712 may connect the right side of the bottom body 711 and the right side of the bottom plate 630.

The second side body 713 may determine a shape of a left surface of the bottom receiving part 700. The second side body 713 may connect the bottom body 711 and the bottom plate 630 on the left side of the bottom body 711 and the bottom plate 630. That is, the first side body 712 may connect the left side of the bottom body 711 and the left side of the bottom plate 630. The second side body 713 may face the first side body 712.

The third side body 714 may determine a front shape of the bottom receiving part 700. The third side body 714 may connect the bottom body 711, the bottom plate 630, the first side body 712 and the second side body 713 from the front surface.

A box 800 provided with a predetermined receiving space may be inserted into the accommodation space of the bottom receiving part 700. The box 800 may be provided in the accommodation space of the bottom receiving part 700 so as to be inserted and discharged along the forward-rearward direction.

The receiving space of the box 800 may accommodate components. The components may include an electronic component for applying power and/or a signal to the electronic component disposed on the rear surface of the PCB plate 400. For example, the component may include a power supply 820 that supplies power to the power distributor 410 disposed on the rear surface of the PCB plate 400. Although described later, the electronic component disposed in the box 800 and the electronic component disposed on the rear surface of the PCB plate 400 may be electrically connected through one or more cables 1501 (see FIG. 17). In addition, the component may include a heat dissipation component for discharging heat generated in the environment inside the box 800 to the outside. For example, the heating component may include one or more fans 880.

The box 800 may be slidably inserted into the accommodation space of the bottom receiving part 700. To this end, the display device 10 may include guide rails 721 and 723, and sliders 851 and 853 that are fastened to the guide rails 721 and 723 to be slidably provided. The guide rails 721 and 723 may provide a moving path through which the sliders 851 and 853 can move along the forward-rearward direction.

The guide rails 721 and 723 may be positioned inside the bottom receiving part 700 in the left and right directions, respectively. For example, the guide rails 721 and 723 may include a first guide rail 721 and a second guide rail 723. The first guide rail 721 may be fixed to the inside of the first side body 712. The second guide rail 723 may be fixed to the inside of the second side body 713.

The first side body 712 may provide an inner space for accommodating the first guide rail 721. The second side body 713 may provide an inner space for accommodating the second guide rail 723. The inner space may be opened toward the inside of the bottom receiving part 700. For example, the first side body 712 and the second side body 713 are formed in a "⊏" shape to respectively accommodate the first guide rail 721 and the second guide rail 723 inside.

The first side body 712 and the first guide rail 721 may be fixed to each other by a coupling structure of a convex portion and a concave portion. The first side body 712 and the first guide rail 721 may be fixed to each other by a first coupling structure and a second coupling structure for limiting movement in multiple directions.

For example, the first coupling structure may include a first convex portion 1712a formed on the first guide rail 721 and protruding toward the first side body 712, and a first concave portion 1712b formed in the first side body 712 and into which the first convex portion 1712a is inserted. Here, a direction in which the first convex portion 1712a protrudes may be the left-right direction. Alternatively, although not shown, the first coupling structure may include a first convex portion 1712a formed on the first side body 712 and protruding toward the first guide rail 721, and a first concave portion 1712b formed on the first guide rail 721 and into which the first convex portion 1712a is inserted.

The second coupling structure may include a second convex portion 1712c formed on the first side body 712 and protruding toward the first guide rail 721, and a second concave portion 1712d formed on the first guide rail 721 and into which the second convex portion 1712c is inserted. Alternatively, the second coupling structure may include a second convex portion 1712c formed on the first guide rail 721 and protruding toward the first side body 712 and a second concave portion 1712c formed in the first side body 712 and into which the second convex portion 1712c is inserted. Here, the direction in which the second convex portion 1712c protrudes may be the up-down direction intersecting the direction in which the first convex portion 1712a protrudes.

A coupling structure of the second side body 713 and the second guide rail 723 may be the same as the coupling structure of the first side body 712 and the first guide rail 721.

The sliders 851 and 853 may be positioned outside the box 800 in the left and right directions, respectively. For example, the sliders 851 and 853 may include a first slider 851 and a third slider 853. The first slider 851 may be fixed to the outside of the box 800 so as to face the first guide rail 721. The first slider 851 may be slidably fastened to the first guide rail 721. The third slider 853 may be fixed to the outside of the box 800 so as to face the second guide rail 723. The third slider 853 may be slidably fastened to the second guide rail 723.

After the box 800 is inserted into the bottom receiving part 700, the box 800 may be detachably fixed to the bottom receiving part 700. To this end, the box 800 may further include a rear cover 803 disposed on the rear surface. The rear cover 803 may be fixed to the rear of the box 800. The rear cover 803 covers the rear surface of the box 800, and further extends in the left and right direction to cover at least a portion of the rear surface of the bottom receiving part 700. The extended part of the rear cover 803 and the bottom receiving part 700 may be fixed to each other through a fixing member such as a screw.

A support member 750 for supporting a load of an upper structure may be further provided on the third side body 714. The support member 750 may be fixed inside the third side body 714. The third side body 714 may provide an inner space for accommodating the support member 750. The inner space may be opened toward the inside of the bottom receiving part 700. For example, the third side body 714 may be formed in a "⊏" shape to accommodate the support member 750 inside. For example, the support member 750 may have the same shape as the first guide rail 721 and the second guide rail 723.

The third side body 714 and the support member 750 may be fixed to each other by a coupling structure of a convex portion and a concave portion. The third side body 714 and the support member 750 may be fixed to each other by a first coupling structure and a second coupling structure for limiting movement in multiple directions. The first coupling structure may be the same as the first coupling structure between the first side body 712 and the first guide rail 721, and the second coupling structure may be the same as the second coupling structure between the second side body 713 and the second guide rail 723.

The top plate 610 may further include a buffer member 620. The buffer member 620 may be positioned on the upper surface of the top plate 610. The buffer member 620 may support the display panel 100 to which the case member is coupled from below. In other words, the buffer member 620 may support the frame 300 from below. The buffer member 620 may be rubber, but is not limited thereto.

The buffer member 620 may be disposed to extend long along the left and right directions as one body. Alternatively, the buffer member 620 may be divided into a plurality of bodies and disposed at a plurality of positions, and adjacent buffer members 620 may be disposed adjacent to each other along the left and right direction.

The buffer member 620 may be fixed to the upper surface of the top plate 610. For example, as shown, a locking protrusion 615 protruding upward may be provided on the upper surface of the top plate 610, and the buffer member 620 may be provided with a locking groove into which the locking protrusion 615 can be fitted. For another example, although not shown, a locking groove 625 extending along the left and right directions may be provided on the upper surface of the top plate 610, and the buffer member 620 may be fitted into the locking groove 625.

As the buffer member 620 fills the space between the top plate 610 and the display panel 100 to which the case member is coupled. Therefore, it is possible to prevent a gap from being formed between the frame 300 and the top plate 610 due to the sagging of the central portion of the top plate 610 by the load of the display panel 100 and the case member.

FIGS. 17 to 19 are diagrams illustrating a cable receiving part provided in a stand according to an embodiment of the present disclosure.

Referring to FIGS. 17 to 19, the stand 600 may include cable receiving parts 1000-1 and 1000-2. The cable receiving parts 1000-1 and 1000-2 may accommodate cables 1501 and 1503 for transmitting power and/or signals to the electronic components disposed on the rear surface of the PCB plate 400.

The top plate 610 may include one or more top receiving parts 610a having an inner space opened rearward. A plurality of top receiving parts 610a may be provided as needed. The top plate 610 may include one or more top holes 613 open upward. The top hole 613 may open the top receiving part 610a toward the display panel 100 and/or the case member.

The first side plate 650 may include a first side receiving part 650a having an inner space opened rearward. The first side receiving part 650a may communicate with the top receiving part 610a. That is, the first side receiving part 650a and the top receiving part 610a may be connected to form one inner space.

The first side receiving part 650a may include a first side hole 651 opened toward the bottom receiving part 700. The bottom receiving part 700 may include a bottom hole 712a opened toward the first side hole 651. The bottom hole 712a may be formed in the first side body 712. In addition, the box 800 inserted into the bottom receiving part 700 may include a box hole 800a opened toward the first side hole 651.

The second side plate 670 may include a second side receiving part 670a having an inner space opened rearward. The second side receiving part 670a may communicate with the top receiving part 610a. That is, the second side receiving part 670a and the top receiving part 610a may be connected to form one inner space. The top receiving part 610a communicating with the second side receiving part 670a may be a separate receiving part separated from the top receiving part 610a communicating with the first side receiving part 650a.

The second side plate 670 may include a second side hole 671 opened toward the outside. The second side hole 671 may be preferably opened downward and/or rearward.

The top receiving part 610a, the first side receiving part 650a, and the bottom receiving part 700 may constitute a first cable receiving part 1000-1. The first cable receiving part 1000-1 may accommodate at least one cable 1501 electrically connecting the electronic component disposed on the rear surface of the PCB plate 400 and the component accommodated in the box 800. That is, the cable 1501 may pass through the groove 501 of the back cover 500 and be provided to the stand 600. The cable 1501 provided to the stand 600 may pass through the top hole 613 and extend to the top receiving part 610a and the first side receiving part 650a. The extended cable 1501 may pass through the first side hole 651, the bottom hole 712a, and the box hole 800a to be connected to the component provided in the bottom box 800.

The top receiving part 610a and the second side receiving part 670a may constitute a second cable receiving part 1000-2. The second cable receiving part 1000-2 may accommodate at least one cable 1503 electrically connecting the electronic components disposed on the rear surface of the PCB plate 400 and external components and/or power. That is, the cable 1503 may pass through the groove 501 of the back cover 500 and be provided to the stand 600. The cable 1503 provided to the stand 600 may pass through the top hole 613 and extend to the top receiving part 610a and the second side receiving part 670a. The extended cable 1503 may pass through the second side hole 671 and be exposed to the outside.

The stand 600 may further include a cable cover 900 for opening and closing the cable receiving part. The cable cover 900 may be detachably coupled to at least one of the top receiving part 610a, the first side receiving part 650a, and the second side receiving part 670a. The cable cover 900 may prevent the cable accommodated in the top receiving part 610a, the first side receiving part 650a, and the second side receiving part 670a from being separated.

For example, the cable cover 900 may be provided to close the inner space that is open toward the rear of the top receiving part 610a. The cable cover 900 may be fitted and coupled to the top receiving part 610a. To this end, the cable cover 900 may include fitting protrusions 901a and 901b, and the top receiving part 610a may include fitting grooves 903a and 903b provided inside and into which the fitting protrusions 901a and 901b are inserted. The fitting protrusions 901a and 901b may include a first fitting protrusion 901a protruding upward and a second fitting protrusion 901b protruding downward. The fitting grooves 903a and 903b may include a first fitting groove 903a into which the first fitting protrusion 901a is inserted and a second fitting groove 903b into which the second fitting protrusion 901b is inserted.

The cable cover 900 may be made of a material having a predetermined elasticity. The first fitting protrusion 901a and the second fitting protrusion 901b of the cable cover 900 may move upward along the inner surface of the tower receiving part 610a, and then may be seated in the first fitting groove 903a and the second fitting groove 903b. In this case, the cable cover 900 may maintain a state seated in the top receiving part 610a unless a separate external force is provided.

FIGS. 20 and 21 are diagrams illustrating a heat dissipation structure according to an embodiment of the present disclosure.

Referring to FIGS. 20 and 21, the display device may further include a heat dissipation mechanism for dissipating heat generated from components accommodated in the box 800 to the outside.

The box 800 may include an air inlet 871 serving as a path through which the air is introduced, and an air outlet 873 serving as a path through which the air is discharged. The air inlet 871 may include inlet slits 871a opened rearward. The air outlet 873 may include outlet slits 873a opened rearward. The inlet slits 871a may be positioned adjacent to one side (e.g. right side) of the box 800, the outlet slits 873a may be positioned adjacent to the other side (e.g. left side) of the box 800.

The heat dissipation mechanism may include one or more fans 880. The fan 880 may be disposed adjacent to the outlet slits 873a of the air outlet 873 in the box 800. The fan 880 may form a difference between an internal air pressure and an external air pressure. As the external air pressure is increased by the fan 880 compared to the internal air pressure, the external air may be introduced into the box 800 through the air inlet 871. The air introduced through the air inlet 871 may be discharged to the outside of the box 800 by the fan 880 after cooling the components accommodated in the box 800.

A plurality of fans 880 may be configured. For example, the fan 880 may include a first fan 881 and a second fan 883 disposed closer to the outlet slits 873a of the air outlet 873 than the first fan 881.

Air vents 881a and 883a of the first fan 881 and the second fan 883 may have a predetermined discharge direction. A discharge direction of the fan 880 may correspond to a direction in which the air vents 881a and 883a are opened. The discharge direction of the fan 880 may be selected in consideration of air flow efficiency. To this end, a discharge direction of the first fan 881 and a discharge direction of the second fan 883 may be different. The discharge direction of the first fan 881 may be tilted by a predetermined angle a from the discharge direction of the second fan 883. For example, the discharge direction of the second fan 883 may be directed toward the outlet slits 873a. The discharge direction of the first fan 881 may be directed toward a direction tilted by the predetermined angle from the discharge direction of the second fan 883. Here, the predetermined angle may be an acute angle or a right angle. The discharge direction of the first fan 881 may be directed toward the other side (e.g. a left side) of the box 800. If necessary, in consideration of the selected orientational direction, a duct for guiding the air flow path may be further provided.

FIGS. 22 to 24 are diagrams illustrating a sound reflector according to an embodiment of the present disclosure.

Referring to 22 to 24, the display device may further include a sound reflector 950. The sound reflector 950 controls a sound path of sound provided from the speaker 420. That is, the sound reflector 950 switches a path of sound provided from the speaker 420 and may control the path so that the sound is directed to the front where a user is located. Accordingly, the display device according to an exemplary embodiment of the present disclosure has an advantage of minimizing sound loss and providing high quality sound to the user.

The sound reflector 950 may be positioned on the lower surface of the top plate 610. Sound generated by the speaker 420 disposed on the rear surface of the PCB plate 400 may be provided to the front by changing a path by the sound reflector 950 disposed on the lower surface of the top plate 610. To reduce sound loss, the top plate 610 may include a sound hole 617. The sound hole 617 may overlap with the speaker 420 in the up-down direction. The sound hole 617 may overlap with the sound reflector 950 in the up-down direction.

The sound reflector 950 may include a fixing part 951 and an inclined part 953.

The fixing part 951 may be a part fixed to the lower surface of the top plate 610. The fixing part 951 may be detachably coupled to the top plate 610. For example, as a fixing mechanism for fixing the fixing part 951 and the top plate 610, a magnet 910 and an auxiliary plate 920 detachably provided to the magnet 910 may be further included. The auxiliary plate 920 may be a ferromagnetic substance. The magnet 910 may be fixed to an upper surface of the fixing part 951 through at least one fixing member. The auxiliary plate 920 may be fixed to the lower surface of the top plate 610 through at least one fixing member. The fixing member may be a screw, but is not limited thereto.

The inclined part 953 extends from the fixing part 951 and may have a shape inclined with respect to the fixing part 951 by a predetermined angle. As the inclined part 953 has a predetermined inclination, a distance between the inclined part 953 and the top plate 610 may gradually increase from the rear to the front. The inclined part 953 may overlap with the sound hole 617 in the vertical direction. That is, the sound hole 617 exposes the inclined part 953 positioned below the top plate 610, but may be opened toward the speaker 420. Accordingly, the sound provided from the speaker 420 may be transmitted to the user located in the front after the path is changed in the inclined part 953 through the sound hole 617.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A display device comprising: a display panel; a frame coupled to a rear of the display panel; at least one first guide plate fixed to a rear of the frame and having a guide groove; a stand positioned below the display panel, and including: a top plate including at least one protruding support guide inserted into the guide groove of the at least one first guide plate to couple the display panel to the stand; a bottom plate spaced apart from the top plate; first and second side plates connecting the top plate and the bottom plate; and a bottom receiving part coupled to a lower part of the bottom plate and including an electronic component accommodation space; at least one second guide plate fixed to the rear of the frame; and at least one support head fixed on the top plate and coupled to the at least one second guide plate through a screw, wherein the at least one protruding support guide and the at least one support head are disposed adjacent to each other along a length direction of the display panel, wherein the at least one protruding support guide includes first and second protruding support guides spaced equally from a center vertical axis of the stand, wherein the at least one first guide plate includes one guide plate positioned to correspond with the first protruding support guide and another guide plate positioned to correspond with the second protruding support guide, wherein the at least one second guide plate fixed to the rear of the frame includes at least four second guide plates, and wherein the at least support head fixed on the top plate includes at least four support heads to be coupled to the four second guide plates using screws.

2. The display device of claim 1, further comprising:
an electronic component positioned at the rear of the frame and transmitting a predetermined power or signal to the display panel;
a back cover covering the electronic component; and
a rigid bar positioned between the frame and the back cover.

3. The display device of claim 2, wherein the rigid bar includes:
a first body extending in a length direction of the display panel; and
a plurality of second bodies extending from the first body in a direction perpendicular to extending length direction of the first body.

4. The display device of claim 3, wherein the second bodies are spaced apart in the length direction of the display panel, and
wherein the electronic component is disposed between adjacent second bodies.

5. The display device of claim 4, further comprising:
a cable connecting the electronic component disposed between the adjacent second bodies to another electronic component included in the electronic component accommodation space of the bottom receiving part,
wherein the back cover includes:
a partially recessed groove accommodating a part of the cable; and
an open hole opening a portion of the groove, and wherein the cable or a connector connected to the cable passes through the open hole.

6. The display device of claim 5, wherein the top plate includes:
a top receiving part having an inner space opened rearward; and
one or more top holes opening at least a part of the top receiving part toward the display panel,
wherein at least one of the first and second side plates includes a side receiving part having an inner space opened reward and communicating with the top receiving part, and
wherein the cable extends through the top hole and is accommodated in inner spaces of the top receiving part and the side receiving part.

7. The display device of claim 6, further comprising:
a box slidingly coupled into the electronic component accommodation space of the bottom receiving part,
wherein the cable extends from the side receiving part and is accommodated in the box.

8. The display device of claim 7, wherein the bottom receiving part includes a bottom hole through which the cable passes, and
wherein the box includes a box hole through which the cable passes.

9. The display device of claim 1, further comprising:
a speaker positioned at the rear of the frame; and
a sound reflector positioned below the top plate,
wherein the sound reflector includes:
a fixing part fixed to the top plate; and
an inclined part extending from the fixing part, in which a gap between the inclined part and the top plate gradually increases from a rear to a front, and
wherein the top plate exposes the inclined part and includes a speaker hole opened toward the speaker.

10. The display device of claim 9, wherein the speaker and the speaker hole overlap in a vertical direction.

11. The display device of claim 9, wherein the speaker hole and the inclined part overlap in a vertical direction.

12. The display device of claim 9, further comprising:
a magnet fixed to an upper surface of the fixing part; and
an auxiliary plate fixed to a lower surface of the top plate, and including a ferromagnetic material attached to the magnet.

13. The display device of claim 1, further comprising:
a buffer member buffering the display panel from below,
wherein the top plate includes a locking protrusion protruding toward the display panel, and
wherein the buffer member is fitted to the locking protrusion.

14. The display device of claim 1, further comprising:
a rigid bar fixed to the back surface of the frame and including a first body extending in a length direction of the display panel, and at least two spaced apart second bodies extending perpendicular to the first body;
a first electronic component positioned at the rear of the frame between a first set of adjacent second bodies;
a back cover covering the rigid bar and the first electronic component; and
a cable connecting the first electronic component to a second electronic component positioned inside of the electronic component accommodation space of the bottom receiving part of the stand.

15. The display device of claim 14, wherein the first electronic component is a power distributor and the second electronic component is a power supply.

16. The display device of claim 15, wherein the bottom receiving part comprises a box slidably inserted into the bottom receiving part such that the power supply can be placed in the box and slidably inserted into the bottom receiving part, and
wherein the cable passes through holes in the box and the bottom receiving part, a hole and an inner opened space of one of the first and second side plates, an inner opened space and hole of the top plate, and a partially recessed groove included in the back cover to connect the power supply to the power distributor.

17. The display device of claim 14, further comprising:
a third electronic component positioned at the rear of the frame between a second set of adjacent second bodies; and
a fourth electronic component positioned at the rear of the frame between a third set of adjacent second bodies,
wherein the third electronic component is a timing controller board and the fourth electronic component is a main circuit board.

* * * * *